(12) United States Patent
Nakazawa et al.

(10) Patent No.: US 12,050,198 B2
(45) Date of Patent: Jul. 30, 2024

(54) ELECTROPHORESIS DEVICE CAPABLE OF CARRYING OUT ELECTROPHORESIS ON PLURALITY OF SAMPLES INDEPENDENTLY

(71) Applicant: Hitachi High-Tech Corporation, Tokyo (JP)

(72) Inventors: Taro Nakazawa, Tokyo (JP); Shuhei Yamamoto, Tokyo (JP); Shunichi Kariya, Tokyo (JP); Katsuhiro Aritome, Tokyo (JP); Ayaka Okuno, Tokyo (JP); Ryoji Inaba, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 803 days.

(21) Appl. No.: 17/276,606

(22) PCT Filed: Feb. 28, 2019

(86) PCT No.: PCT/JP2019/007751
§ 371 (c)(1),
(2) Date: Mar. 16, 2021

(87) PCT Pub. No.: WO2020/174644
PCT Pub. Date: Sep. 3, 2020

(65) Prior Publication Data
US 2022/0042945 A1 Feb. 10, 2022

(51) Int. Cl.
*G01N 27/447* (2006.01)

(52) U.S. Cl.
CPC . *G01N 27/44721* (2013.01); *G01N 27/44743* (2013.01)

(58) Field of Classification Search
None
See application file for complete search history.

(56) References Cited

U.S. PATENT DOCUMENTS

| 6,372,484 B1 | 4/2002 | Ronchi et al. |
| 6,531,282 B1 | 3/2003 | Dau et al. |

(Continued)

FOREIGN PATENT DOCUMENTS

| JP | H10-206382 A | 8/1998 |
| JP | H10-253587 A | 9/1998 |

(Continued)

OTHER PUBLICATIONS

Machine Translation to English of JP 2007-147509A (Year: 2007).*

(Continued)

*Primary Examiner* — J. Christopher Ball
(74) *Attorney, Agent, or Firm* — Volpe Koenig

(57) ABSTRACT

Aiming at achievement of timely installation of the cartridge, sequential execution of the pretreatment process in the order of installation of the cartridge, and individual shifting of the process to the electrophoresis process upon completion of the pretreatment process, the electrophoresis device according to the present invention includes a plurality of capillaries each filled with a separation medium, a thermostat chamber for holding the capillaries at a predetermined temperature, an irradiation detector which executes light irradiation and detection in an electrophoresis process using the capillaries, a high voltage power supply unit for voltage application to the capillaries, a liquid feeding mechanism for feeding the separation medium to the capillaries, and an autosampler for conveying containers each holding a reagent or a sample to the capillary. The voltage application to the capillaries by the high voltage power supply unit is controlled for each of the capillaries.

23 Claims, 21 Drawing Sheets

(56)  References Cited

U.S. PATENT DOCUMENTS

| 9,657,286 | B2 | 5/2017 | Sahoyama et al. |
| 10,821,445 | B2 | 11/2020 | Selden et al. |
| 10,865,440 | B2 | 12/2020 | Eberhart et al. |
| 10,884,008 | B2 | 1/2021 | Nakazawa et al. |
| 2005/0161402 | A1 | 7/2005 | Hanafusa et al. |
| 2009/0107843 | A1* | 4/2009 | Hanafusa ............... G01N 30/88 204/600 |
| 2012/0021451 | A1 | 1/2012 | Matsumoto et al. |
| 2013/0292251 | A1 | 11/2013 | Yamazaki et al. |
| 2017/0138974 | A1 | 5/2017 | Nakazawa et al. |

FOREIGN PATENT DOCUMENTS

| JP | 2005-214710 A | 8/2005 |
| JP | 2012-154757 A | 8/2012 |
| JP | 2014-132276 A | 7/2014 |
| JP | 2014-180250 A | 9/2014 |
| JP | 6012518 B | 10/2016 |
| JP | 6029366 B | 11/2016 |
| JP | 6202713 B | 9/2017 |
| JP | 6216451 B | 10/2017 |
| WO | 2015/186454 A1 | 4/2017 |

OTHER PUBLICATIONS

Machine Translation to English of JP H10-253587 (Year: 1998).*
PCT/JP2019/007751 International Search Report, Jun. 4, 2019, 2 pgs.

* cited by examiner

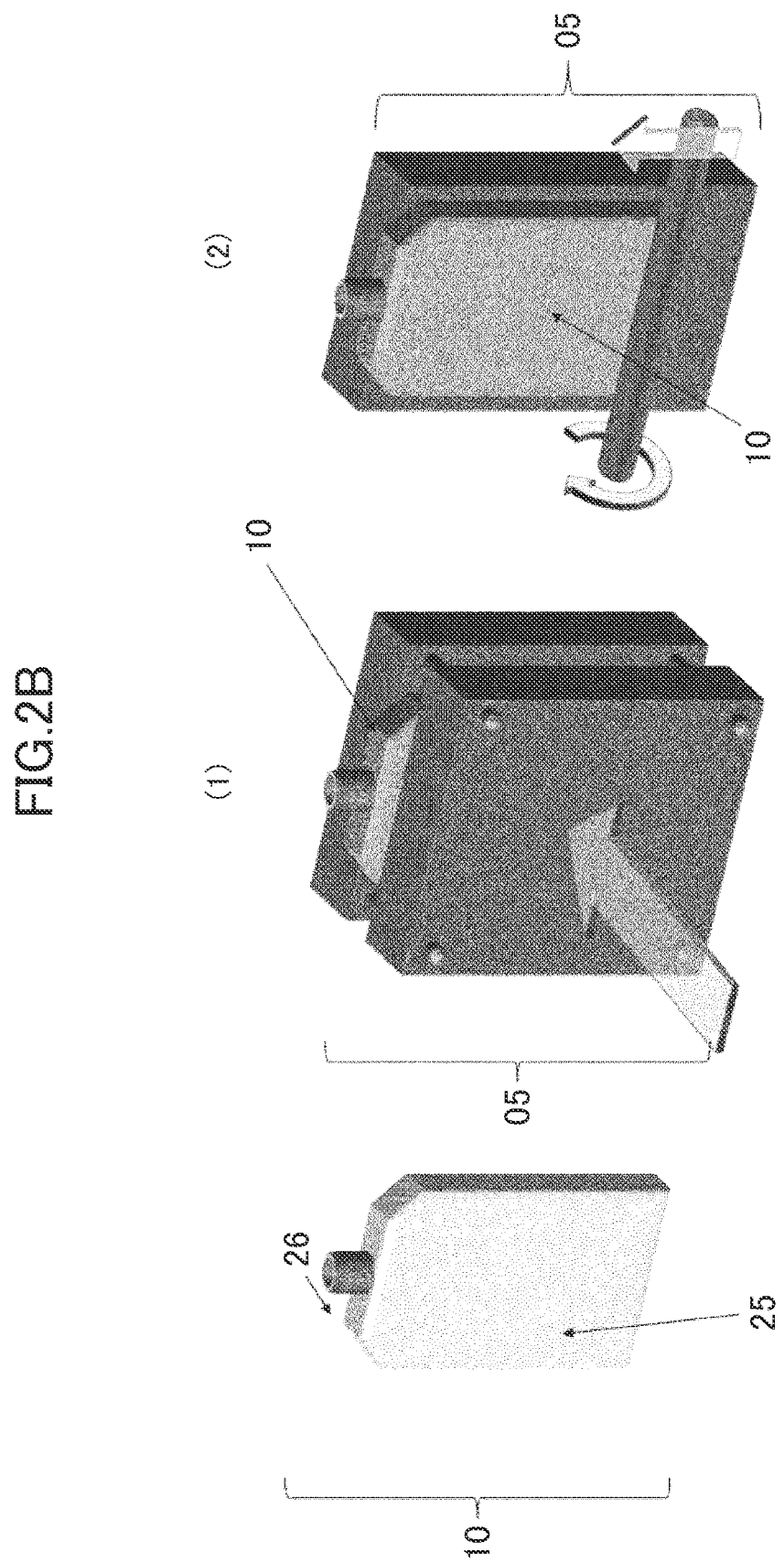

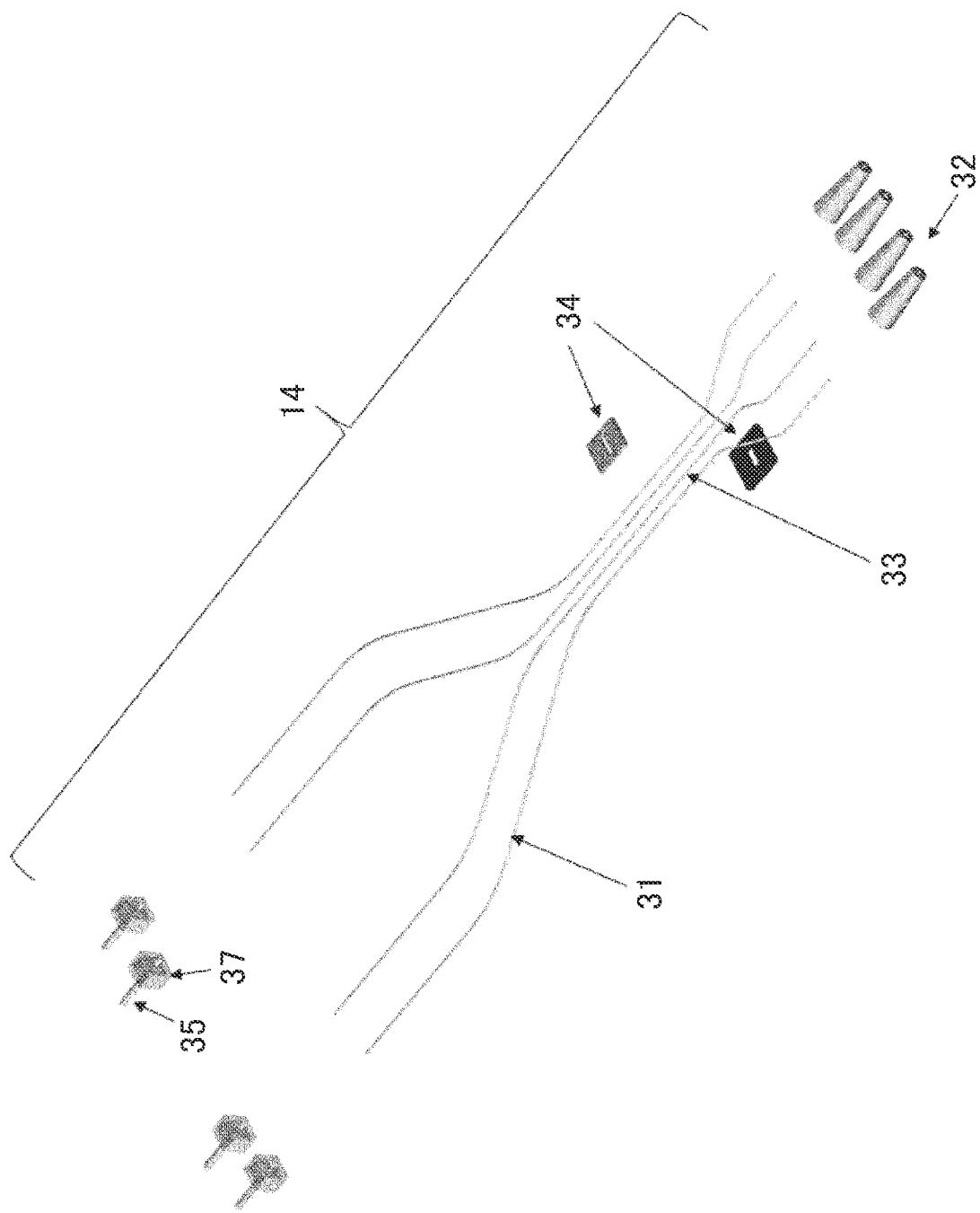

ELECTROPHORESIS DEVICE CAPABLE OF CARRYING OUT ELECTROPHORESIS ON PLURALITY OF SAMPLES INDEPENDENTLY

TECHNICAL FIELD

The present invention relates to an electrophoresis device. The generally employed electrophoresis device is configured to subject a plurality of specimens simultaneously to functions of the pretreatment process for holding cartridge, feeding liquid, stirring, heating/cooling, and functions of the electrophoresis process for polymer filling and voltage application. Unlike the generally employed case as described above, the electrophoresis device according to the present invention is configured to perform those functions for each of the specimens independently so that a plurality of sample containing cartridges are placed at arbitrary timings, and the pretreatment process and the electrophoresis process are executable in a shorter TAT.

BACKGROUND ART

Applications using the nucleic acid analysis have been practically implemented in various fields including medical jurisprudence, immigration/emigration control, counterterror measures, and the like.

In the medical jurisprudence field, the STR analysis has been put into practical use. The STR analysis is performed for analyzing repeating base sequence (Short Tandem Repeat: STR) in a specified region of genome. As the STR base sequence length is unique to an individual, the analysis is utilized to conduct DNA testing for personal identification and parentage diagnosis.

Patent Literature 1 discloses the STR analysis method for simultaneously analyzing 13 regions designated by the US Federal Bureau of Investigation. In the STR analysis, the specimen sample is collected from an organism (mainly a human body). DNA is extracted from the collected specimen sample for DNA amplification and DNA denaturation into single stranded. Then separation and detection of the DNA fragment are executed sequentially.

More specifically, the nucleic acid (mostly, DNA) serving as a template is extracted from the biological sample or the specimen sample such as the sample of organism-derived substance. The extracted template DNA is amplified through PCR (Polymerase Chain Reaction). Formamide-treatment or heating/quick cooling is executed for denaturing the double stranded DNA into single stranded. In the DNA amplification, multiplex PCR amplification is executed using 13 types of primer sets for the single measurement DNA sample. During DNA amplification, the DNA fragment as the amplification product is labelled. The solution derived from the DNA amplification and labelling becomes an analysis sample.

The series of process steps up to the step for producing the analysis sample from the specimen sample constitute the pretreatment process. The subsequent process steps for separating the labelled DNA fragment through electrophoresis, and detecting and analyzing the electrophoresis pattern of the separated DNA fragment constitute the electrophoresis process.

The use of the known DNA sequencer for human genome analysis has contributed to automation of separation and detection of the DNA fragment. Meanwhile, the pretreatment process has been generally executed by the skilled worker manually. Recently, automating the pretreatment process has been tentatively applied to the genetic analysis including the STR analysis, which involves not only limited facilities and skilled workers, but also more diversified cases.

Patent Literature 2 discloses the reagent storage device having reagents sealed while being shut out from the outside air for the purpose of preventing mixture of DNA and RNA except the sample. Patent Literature 3 discloses the structure for feeding and stirring reagents in the state where the biochemical cartridge with similar structure to the reagent storage device is shut out from the outside air without using the pipette and the dispenser robot. Patent Literature 4 discloses structures of the temperature control mechanism, the temperature control block, and the biochemical treatment device, which are suitable for conducting the PCR within the biochemical cartridge.

According to those patent literatures, the DNA sample charged into the reagent storage device or the biochemical cartridge is fed while being shut out from the outside air, stirred, and temperature controlled for amplifying and labelling the DNA sample to be formed into the analysis sample available for the fragment analysis. Patent Literature 5 discloses structures of the cartridge of pretreatment/electrophoresis integrated type, and the pretreatment integrated capillary electrophoresis device as well as the unit for detecting the analysis sample.

CITATION LIST

Patent Literature

Patent Literature 1: U.S. Pat. No. 6,531,282
Patent Literature 2: Japanese Patent No. 6216451
Patent Literature 3: Japanese Patent No. 6202713
Patent Literature 4: Japanese Patent No. 6012518
Patent Literature 5: Japanese Patent No. 6029366

SUMMARY OF INVENTION

Technical Problem

Although various automation techniques that involve the STR analysis have been developed, such automation techniques have hardly become mainstream of the STR analysis because of the turnaround time (hereinafter referred to as TAT) taken for conducting the STR analysis. The TAT as the term used in the fields of information and aircraft generally refers to the time period taken to complete one task. The TAT of the STR analysis having the pretreatment process automated refers to the time period taken from the operation of the user for charging the specimen sample which contains DNA and protein into the device until the device displays the analysis result. The series of operations mainly include the pretreatment process and the electrophoresis process. The pretreatment process includes four main steps of charging the specimen sample, extracting DNA, amplifying DNA, and denaturing the DNA into single stranded. The electrophoresis process includes three steps of separating the DNA fragment, detecting the DNA fragment, and displaying the analysis result.

The above-described time period becomes the waiting time for the user, and accordingly, it is preferable to make the TAT as short as possible.

There are two approaches for achieving the short TAT, one for reducing the time for executing each process step, and the other for reducing the waiting time between the process steps.

In the approach for reducing the time for executing each process step, among entire process steps of the STR analysis, execution of the DNA amplification in the pretreatment process, and the DNA fragment separation in the electrophoresis process will take much time. A great deal of effort for reducing the time period for executing those process steps has been made by, for example, reagent manufacturers. Such effort of reducing the time for executing the process has gradually paid off year by year.

The inventor has focused on the other approach for reducing the waiting time between the process steps. Patent Literature 5 discloses the process for proceeding the analysis sample produced through the pretreatment process to the subsequent electrophoresis process. In the disclosure, the sample in the cycle sequence zone within the cartridge is fed to the electrophoresis solution chamber, and the autosampler on which the cartridge is placed is moved so that both ends of the capillary come in contact with the electrophoresis solution chamber and the anode-side buffer solution chamber, respectively. Then weak voltage is applied to both ends of the capillary for a short time so that a proper quantity of sample is introduced into the capillary filled with the separation medium. Thereafter, both ends of the capillary are immersed in the cathode-side buffer solution chamber and the anode-side buffer solution chamber, respectively for separating the DNA fragment by the separation medium having its temperature controlled by high voltage application. The fluorescence excited by the irradiation light emitted from the laser is detected by the detector so that the DNA fragment is detected.

Patent Literature 5 discloses the electrophoresis and fluorescence detection, which are executed using the single unit of device and the single cartridge. Patent Literature 3 also discloses the use of the single unit of device required for the single specimen sample. Compared with the case of using the single unit of device for analyzing only the single specimen, the case of using the single unit of device for analyzing a plurality of specimens generally results in higher throughput.

Patent Literature 2 discloses automation of the pretreatment process applied to a plurality of specimens. However, in the disclosure, there is no description on execution of the electrophoresis and detection of the analysis sample which has been subjected to a plurality of pretreatment process steps. In the case where the specimen samples are prepared simultaneously, the TAT may be shortened by combining structures disclosed in Patent Literature 2 and Patent Literature 5. That is, execution of the pretreatment process as disclosed in Patent Literature 2 allows production of the analysis samples simultaneously. If the structure disclosed in Patent Literature 2 is installed on the autosampler as disclosed in Patent Literature 5, the plurality of analysis samples may be directly connected to the capillaries simultaneously.

In the case where the plurality of specimen samples are prepared simultaneously, combining disclosed structures of patent literatures allows provision of the automatic STR analysis device configured to execute both the pretreatment process and the electrophoresis process in short TATs, respectively.

It may be difficult to satisfy the actual working condition to prepare the plurality of specimen samples simultaneously. For example, in the case of personal identification for criminal investigation, waiting until acquirement of the plurality of specimen samples may delay solution of the crime. In the case of personal identification in natural disasters, the waiting time may affect policies for the rescue activities.

Meanwhile, analysis of the specimen sample upon acquirement in sequence every time it is supplied may increase the running cost. While the device is running, generally, the next process step to another incoming specimen sample cannot be started until completion of all the process steps currently operated by the device.

In the circumstances estimated that the specimen sample B is supplied in the pretreatment process executed to the specimen sample A required to be measured, or the specimen sample C is supplied in the electrophoresis process executed to the specimen sample B, the device is required to flexibly cope with the foregoing circumstances.

The flexible countermeasure may be achieved by preparing a large number of analysis devices each handling the single specimen, sufficient to satisfy the requirement. However, as it is difficult to predict the timing or scale of the criminal investigation or natural disaster, a large stock of such analysis devices each for analyzing only one specimen in preparation for such unpredictable events may impose heavy burden on the user.

That is, the user demands the electrophoresis device which allows placement of a plurality of cartridges each containing the specimen sample at arbitrary timing, and execution of the pretreatment process and the electrophoresis process in the shorter TAT. The combination of the existing device with the one disclosed in related art fails to achieve operations as described below:

(1) timely installation of the cartridge;
(2) sequential execution of the pretreatment process in the order of installation of the cartridge; and
(3) individual shifting of the process to the electrophoresis process upon completion of the pretreatment process.

Solution to Problem

The electrophoresis device according to the present invention includes a plurality of capillaries each filled with a separation medium, a thermostat chamber for holding the capillaries at a predetermined temperature, an irradiation detector which executes light irradiation and detection in an electrophoresis process using the capillaries, a high voltage power supply unit for voltage application to the capillaries, a liquid feeding mechanism for feeding the separation medium to the capillaries, and an autosampler for conveying containers each holding a reagent or a sample to the capillary. The voltage application to the capillaries by the high voltage power supply unit is controlled for each of the capillaries.

Advantageous Effects of Invention

Following effects may be derived from the structures as described above:

(1) timely installation of the cartridge;
(2) sequential execution of the pretreatment process in the order of installation of the cartridge; and
(3) individual shifting of the process to the electrophoresis process upon completion of the pretreatment process.

BRIEF DESCRIPTION OF DRAWINGS

FIG. 2B illustrates a bag-like polymer container and a polymer delivery unit.

FIG. 3A schematically illustrates a capillary array.

DESCRIPTION OF EMBODIMENTS

Figure 1:
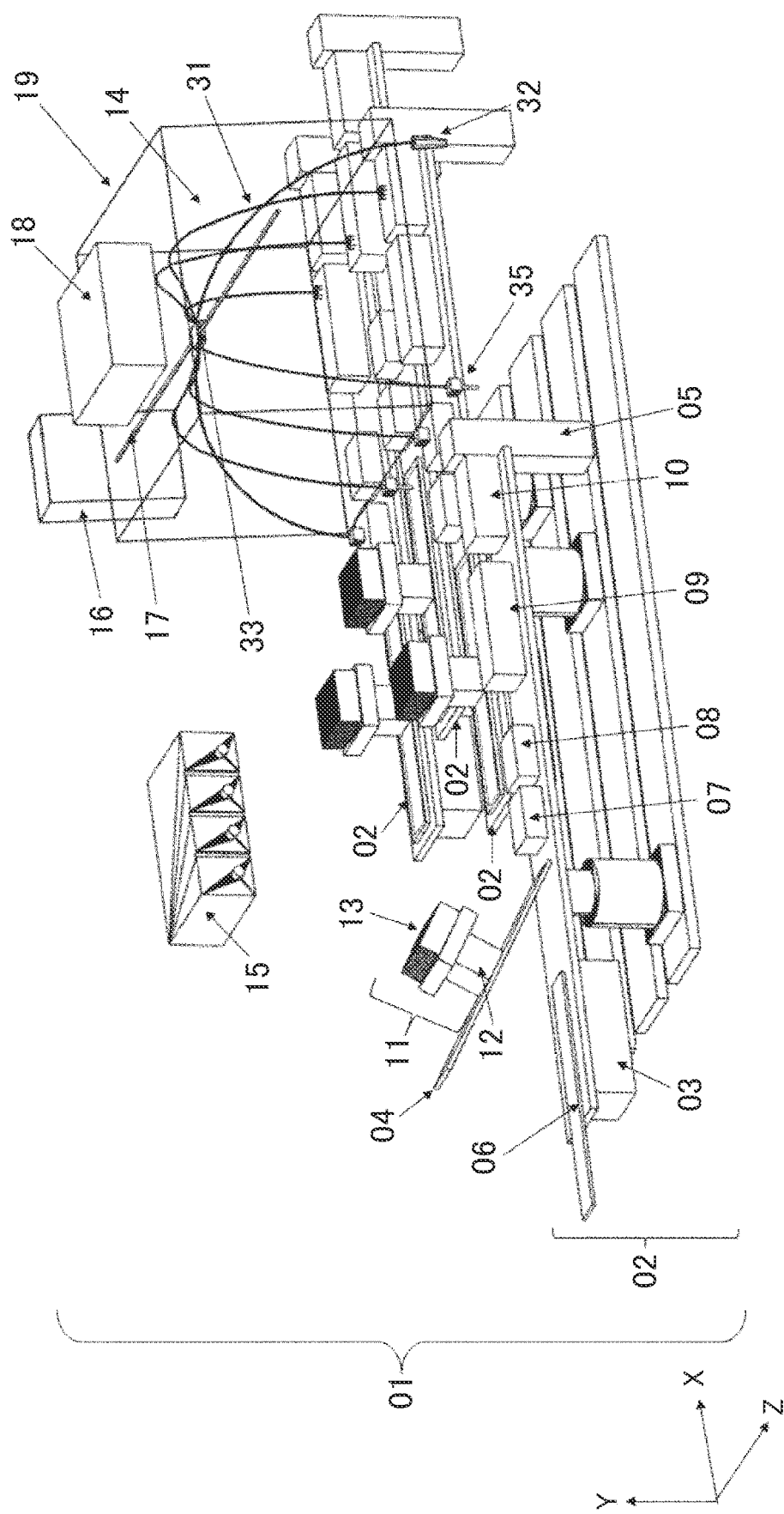
FIG. 1 is a perspective view of a pretreatment-integrated electrophoresis device.

For development of the device that allows installation of sample cartridges up to four units, and satisfies the foregoing conditions (1), (2) and (3), it is possible to easily produce the structure by providing the device which accommodates the four sample cartridges and four capillaries with four independent sets of components. Such configuration, however, is substantially the same as the configuration having four units of devices arranged. As provision of the low-cost device is advantageous to users, shared use of functions and components as much as possible has been examined, taking the use of those four sample cartridges and four capillaries as an example. In this case, each number of the sample cartridges and the capillaries is not limited so long as a plurality of sample cartridges and a plurality of capillaries are installable.

Conventionally, the pretreatment process including the cartridge holding function, the liquid feeding function, the stirring function and the heating/cooling function, and the electrophoresis process including the polymer filling function and the voltage application function have been executed simultaneously to the multiple specimens. There has been found out that performing those functions to each individual specimen may satisfy the foregoing conditions as well as configure the structure for implementing those operations. There has also been found out that the device allows independent operations for each specimen while sharedly using at least the irradiation light source, the detector and the thermostat chamber. Explanations will be made with respect to the findings.

<Shared Use of Thermostatic Function in Electrophoresis Process>

Generally, the existing device is configured to have a function that allows setting of the temperature of the thermostat chamber that keeps the capillary temperature constant up to 45° C. to 70° C. Focusing on the condition that the fixed nucleic acid analysis application does not require change in the temperature, it has been found that the capillary temperature may be held constant in the thermostat chamber except the case of stopping the device for capillary exchange. Accordingly, the thermostat chamber is sharedly usable. If each set temperature of the thermostat chambers is the same when conducting the multiple applications, the temperature of the thermostat chamber does not have to be changed. It is possible to conduct different applications simultaneously while sharing the thermostat chamber.

<Shared Use of Irradiation Light Source and Detector in Electrophoresis Process>

Taking the existing device as an example, the irradiation light emitted from the single irradiation light source penetrates through the respective irradiation sections of the multiple capillaries. The existing device is configured to irradiate the light only in the electrophoresis process so that the fluorescence is detected by the detector. When satisfying conditions that the irradiation sections of the capillaries are accurately aligned, and all capillaries are filled with polymer, the light is allowed to penetrate through the irradiation sections. In the existing method, the same voltage is simultaneously applied to all capillaries, respectively. When using the single detector, the reading position of the detector is calibrated in accordance with the number given to the capillary.

The examination was made under the condition that three of four capillaries were filled with polymer, and only the fourth capillary was not filled with polymer, the irradiation light penetrated through the inside of the capillary, and at the same time, emitted scattered light. The scattered light adversely affected detection of at least adjacent capillaries. Meanwhile, when all capillaries of the existing device were filled with polymer, background noise generated in the device was only detected as a result of emitting excitation light to the capillaries in spite of no analysis sample in a certain capillary, or no voltage application. Even when emitting the irradiation light for detection in the polymer filling process, fluctuation in the background noise was very small so long as filling of polymer was successful without generating bubbles. Results of the foregoing examination indicate that the irradiation light source and the detector are sharedly usable.

The explanation has been made with respect to an example of the method for irradiating the multiple capillaries with irradiation light while penetrating therethrough. There have been proposed various light irradiation methods including the one for dividing the light into sections by the number corresponding to the number of the capillaries for irradiation, respectively, and the one for widening the irradiation light to cover across the width of aligned multiple capillaries for irradiation. Filling of the capillary which is not used for analysis with polymer prevents emission of the scattered light, and is available for any one of the irradiation methods.

<Voltage Application to Each Capillary>

The existing device employs the productized capillary array formed by bundling multiple capillaries, and is configured to simultaneously apply the same voltage to the multiple capillaries, respectively. The capillary array is structured to have an end of each capillary inserted through a single conductive hollow pipe, and the other end of the capillary is covered with resin to be formed as a capillary head. The capillary end inserted through the conductive pipe is immersed in a cathode-side buffer solution container, and the other end as the capillary head is immersed in an anode-side buffer solution container. The conductive pipe is in contact with a metal plate. Application of high voltage to the metal plate serves to apply high voltage to polymer within the capillary through the cathode-side buffer solution container. The metal plate is in contact with the conductive pipes each having the same structure for accommodating insertion of the corresponding one of the multiple capillaries. Each of the cathode-side buffer solution containers has the same structure. As a result, the use of the single high voltage power supply allows simultaneous application of the same voltage to all the capillaries, respectively.

According to the present invention, an output of the high voltage power supply is divided to independently apply the high voltage to each of the capillaries. The cathode-side buffer solution containers are prepared by the number corresponding to the number of capillaries. There are two types of devices, that is, the device in which the polymer container and a supply mechanism are separated, and the device in which the polymer container and the supply mechanism are not separated.

First Example

An explanation will be made with respect to the pretreatment-integrated electrophoresis device according to the present invention, taking the STR analysis as one of applications as an example. The STR analysis is only an exemplary case for describing the present invention, and usable for various kinds of fragment analysis, and sequence analysis including the STR analysis, a MLPA (Multiplex Ligation-dependent Probe Amplification) analysis, and a SNP (Single Nucleotide Polymorphism) analysis.

Referring to the drawings, an embodiment of the present invention will be described. The drawings are used for the purpose of explanation, and are not intended to limit the scope of the present invention.

FIG. 1 is a perspective view of a pretreatment-integrated electrophoresis device 01 of an example.

[Autosampler]

An autosampler 02 is an automatic conveying stage unit driven along an XY-axis or XYZ-axis driving direction. The autosampler 02 illustrated by FIG. 1 is driven along the XY-axis. The autosampler 02 includes a pretreatment unit 03, a cartridge cover 04, and a polymer delivery unit 05. A cartridge 06, a cathode-side buffer solution container 07, a waste liquid container 08, an anode-side buffer solution container 09, and a polymer container 10 are expendable conveyance articles to be placed by the user. The autosampler 02 is allowed to drive the cartridge 06, the cathode-side buffer solution container 07, the waste liquid container 08, the anode-side buffer solution container 09, and the polymer container 10 arranged and configured as illustrated by FIG. 1 along the XY-axis, which will be described later in detail.

In the example, the autosamplers 02 are provided by the number corresponding to the number of the installable cartridges 06.

The cartridge 06 is placed on the pretreatment unit 03 installed on the autosampler 02 by the user, and fixed thereto with high positioning accuracy by closing the cartridge cover 04 manually or automatically.

The polymer container 10 is brought into abutment on the polymer delivery unit 05 installed on the autosampler 02 by the user, and fixed thereto with high positioning accuracy manually or automatically.

The cathode-side buffer solution container 07, the waste liquid container 08, the anode-side buffer solution container 09, and the polymer container 10 are placed by the user, and manually or automatically fixed onto the autosampler 02 with high positioning accuracy.

The cartridge 06, the cathode-side buffer solution container 07, the waste liquid container 08, the anode-side buffer solution container 09, and the polymer container 10 as expendables are fixed onto the autosampler 02, each containing the reagent required for electrophoresis. Those containers allow access by a conductive pipe 35 or the capillary head 32 of the capillary 31. Detailed explanation of a capillary array 14 will be made later.

The pretreatment-integrated electrophoresis device 01 as illustrated in FIG. 1 is configured to have the autosamplers 02 by the number equal to the number of the capillaries 31. The autosampler 02 is driven along the XY-axis. Although not shown, the autosamplers 02 by the number larger than that of the capillaries 31 may be provided to allow installation of the cartridges 06 more than the capillaries 31. In this case, the autosampler 02 has the complicated structure to be driven along XYZ-axis. However, treatment efficiency may be improved.

[Pretreatment Unit]

The pretreatment unit 03 is installed on the autosampler 02 to perform liquid feeding and stirring operations.

When operating the pretreatment unit, the user places the cartridge 06, and the cartridge cover 04 is manually or automatically closed.

The pretreatment unit 03 activates the cartridge 06 to feed and stir the reagent or the sample solution contained therein under external force.

A thin elastomer film with its thickness ranging from approximately 0.1 mm to 1 mm is applied to the cartridge 06. Preferably, the liquid feeding is performed by pulsating the cartridge like the diaphragm pump under air pressure. Various liquid feeding methods have been implemented by, for example, utilizing EWOD (electrowetting on Dielectric), and forcing droplets under air pressure.

The stirring operation necessary for mixing is manually performed as simple operations of mixing and moving liquids derived from different origins by pipetting, Vortex, tapping and the like. Typically, the stirring operation is performed using liquid feeding function like a syringe. It is possible to impart the rapid oscillating function to the cartridge 06 for higher stirring efficiency.

It is preferable to add a heater function to come in contact with the position of the cartridge 06 for DNA extraction, or a stirring function for accelerating the DNA extraction from Lysis Buffer.

[Cartridge]

Generally, the pretreatment refers to the process for denaturing the specimen sample acquired by the user into the analysis sample analyzable by the device. The cartridge 06 is the pretreatment device for receiving an input of the specimen sample, and outputting the analysis sample. The cartridge 06 of sealed type has the reagent required for the pretreatment process preliminarily sealed. The cartridge 06 of open type accommodates the reagent charged from the outside. The specimen sample has to be charged into the cartridge of either type.

Assuming that the STR analysis as one of applications of the present invention is implemented, the following four types of cartridges may be employed for faithfully automating the currently operated manual analysis.

The first type is a sample cartridge. When the specimen sample is charged into the sample cartridge, Lysis Buffer serves to extract DNA. The extract liquid is mixed with Primer Mix and Master Mix required for the PCR, through which the DNA is amplified. The amplified DNA is quantitatively determined, and mixed with formamide, which is then denatured into single stranded (in case of necessity, thermal denaturation is executed). The resultant product as the analysis sample is subjected to electrophoresis. For denaturation of DNA into single stranded, it is preferable to mix the DNA with formamide for conducting the thermal denaturation. However, it is good enough to conduct either one of mixture with formamide and thermal denaturation.

The second type is a Negative Control cartridge. In this case, the PCR is conducted without charging the specimen sample, and electrophoresis is further executed in accordance with the same procedures as those in the case of the sample cartridge. The cartridge of this type is used for confirming that nothing is detected, indicating that unnecessary nucleic acid has not been mixed in the PCR system (contamination has not occurred).

The third type is a Positive Control cartridge. In this case, the known control DNA is charged instead of the specimen sample for conducting the PCR, and electrophoresis is further executed in accordance with the same procedures as those in the case of the sample cartridge. The use of this cartridge is intended to confirm that the PCR has been correctly conducted by measuring the control DNA.

The fourth type is a Ladder cartridge. In the cartridge, electrophoresis is executed by mixing Allelic Ladder as an inner index of analysis with formamide without executing the PCR process.

The user combines those types of cartridges 06 as described above as needed. The following example will be described on the assumption that all the sample cartridges are employed.

The cartridge 06 is expendable, and removed after its use.

In the STR analysis, the four cartridges are used. The reagent suitable for each application is sealed in each of the cartridges.

[Cartridge Cover]

The cartridge cover 04 is manually or automatically opened and closed, and has a function of fixing and holding the cartridge 06 when it is closed.

When introducing the analysis sample into the capillary 31 through electrophoresis, a connection port of the cartridge 06 has to be connected to an end of the capillary inserted into the conductive pipe 35. The cartridge cover 04 is required to have its connection port opened.

[Heating/Cooling Unit]

A heating/cooling unit 11 has a structure constituted by a radiator 13, a heat exchanging element, and a heat conductive block 12. Although not shown, it is preferable to dispose the heat exchanging element between the radiator 13 and the heat conductive block 12. The heating/cooling unit 11 is a temperature control unit for conducting the PCR by repeatedly heating and cooling the mixture of the DNA sample extracted from the specimen sample, the Primer Mix, and Master Mix. The above-described liquid mixture exists within the cartridge 06. It is essential to perform rapid and accurate heating and cooling repeatedly in the PCR. Therefore, the heating/cooling unit 11 is required to come in contact with the cartridge 06. For that reason, the cartridge cover 04 is opened, with which the heating/cooling unit 11 is fitted. The heating/cooling unit 11 and the cartridge 06 are configured to come in direct contact with each other. If the cartridge cover 04 has high heat conductivity, the cartridge 06 may be heated or cooled by the heating/cooling unit 11 through the cartridge cover 04.

In the example, the single heating/cooling unit 11 is provided for the single cartridge 06. The heating/cooling unit 11 is attached to the cartridge cover 04. In the structure, it is preferable to employ the heat exchanging element having high-speed temperature raising/lowering property such as a Peltier element. The heat conductive block 12 serves as a heating value medium between the heat exchanging element and the PCR section of the cartridge 06 for uniform heat transfer to the cartridge 06. Preferably, the heat conductive block 12 exhibits high heat conductivity, and low heat capacity. It is therefore preferable to use the hard material with high heat conductivity such as aluminum, and design the structure with a small volume.

[Radiator]

The radiator 13 as a part of the heating/cooling unit 11 has a structure for cooling the heat exchanging element highly efficiently. Accordingly, the radiator comes in contact with the heat exchanging element or/and the heat conductive block 12.

In the case of air cooling, the radiator 13 is generally called the radiation fin which is made of metal material with a large heat transfer area for increasing heat transfer amount. In order to further increase the cooling speed, the air-cooling fan is installed for blowing air against the radiator 13.

In the case of water (liquid) cooling, the radiator 13 is disposed in the form of, for example, water block which allows the coolant flow, the radiator for radiating heat to the outside the device, the pump for circulating the coolant, and the reservoir which temporarily accumulates the coolant so as to be supplied to the pump. The simple water cooler configured by partially integrating those components may also be employed as well. In most cases, the water cooling has cooling efficiency slightly higher than that of the air cooling, and is capable of radiating retrieved heat at an arbitrary location. It is therefore effective for preventing increase in the inner temperature of the device.

[Waste Liquid Container]

The waste liquid container 08 serves to temporarily stores discharged polymer which has been excessively charged into the capillary 31, and already used in the previous process. Generally, polymer is formed as polymeric liquid with high viscosity, and crystallized during drying. Preferably, the waste liquid container is filled with some sort of liquid for the purpose of improving liquid draining upon disposal of waste liquid, and preventing crystallization during drying. It is preferable to employ pure water, buffer solution, and the liquid similar to the buffer solution for the liquid. Referring to FIG. 1, the waste liquid container 08 and the cathode-side buffer solution container 07 are separately provided. However, the waste liquid container 08 and the cathode-side buffer solution container 07 may be integrated into the single container.

[Polymer Container, Polymer Delivery Unit]

The polymer container 10 contains polymer. The polymer delivery unit 05 serves to feed polymer contained in the polymer container 10 to the capillary 31.

The polymer serves as the separation medium for making the electrophoresis speed different when executing the electrophoresis on the analysis sample. The separation medium has two types, that is, fluid type and non-fluid type. In the example, the fluid type polymer is used.

Referring to FIG. 2, an explanation will be made with respect to the polymer container 10 and the polymer delivery unit 05 of the example in detail. FIG. 1 illustrates that the polymer delivery unit 05 is attached to the side surface of the polymer container 10. The polymer delivery unit may be disposed below the polymer container 10.

Figure 2A:
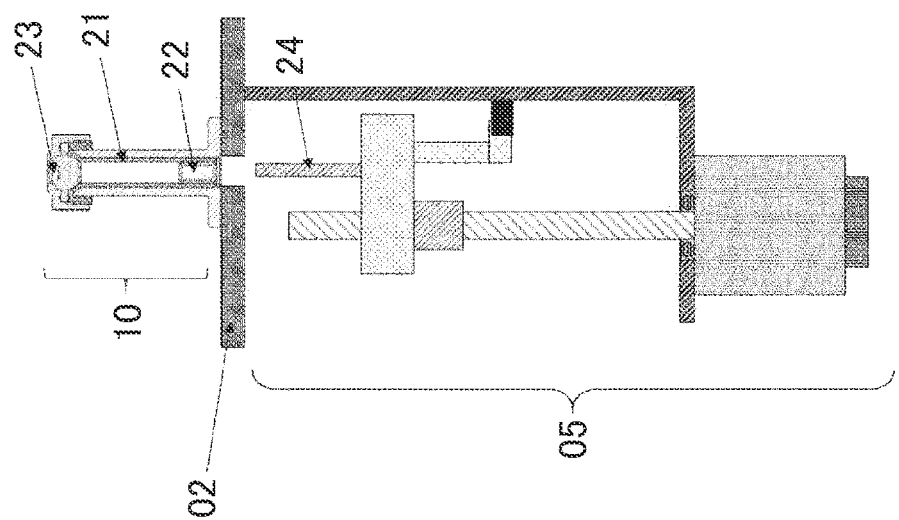
FIG. 2A illustrates a cylindrical polymer container and a polymer delivery unit.

The polymer container 10 as illustrated in FIG. 2A includes a cylinder 21 (in a narrow sense, it is called a syringe), a movable sealing member 22 inside the cylinder while sealing polymer therein, and a connector 23 to which the capillary is connected while holding polymer inside the cylinder. In the state where the capillary 31 comes in contact with the connector 23, or the polymer liquid after penetrating through the connector, external force is applied from the bottom of the polymer container 20 to push up the sealing member so that polymer is charged into the capillary 31. The polymer delivery unit 05 serves as an external force mechanism for operating the bottom of the polymer container. As illustrated by FIG. 2A, the polymer delivery unit 05 includes a plunger 24. The plunger 24 pushes up the sealing member 22 to charge polymer into the capillary.

The use of the cylindrical polymer container 10 is advantageous as the polymer delivery unit 05 may be simply structured with a uniaxial mechanism for moving the plunger 24 up and down as well as small dead volume inside the polymer container 10.

If the polymer container 10 has a small bag-like (pouch-like) shape as illustrated by FIG. 2B, it is constituted by a pouch 25 and a connector 26 without the plunger. The polymer delivery unit 05 is driven to sandwich the pouch for pressing (see FIG. 2B (1)), or driven to squeeze the contained polymer from the bottom of the pouch (see FIG. 2B (2)) so that polymer is charged into the capillary 31.

The use of the pouch-like polymer container 25 is advantageous as the container can be simply designed less costly so that the low-cost container is provided for the user.

In the example, the polymer container 10 is placed on the autosampler 02 for accommodating insertion of the capillary head 32. The polymer delivery unit 05 and the polymer container 10 may be placed at the side of the conductive pipe 35 of the capillary 31 to allow charging of polymer from the side of the conductive pipe 35. In this case, the waste liquid container 08 is located at the side of the capillary head 32.

[Cathode-Side Buffer Solution Container, Anode-Side Buffer Solution Container, Anode Electrode]

Each of the anode-side buffer solution container 09 and the cathode-side buffer solution container 07 contains buffer solution including an electrolyte. The cathode-side buffer solution container 07 and the anode-side buffer solution container 09 are installed on the autosampler 02.

Although not shown, anode electrodes each made of corrosion resistant conductive material such as platinum and SUS are installed on the device by the number corresponding to the number of the capillaries. The anode electrode is disposed to come in contact with liquid contained in the anode-side buffer solution container 09 upon high voltage application to the capillary 31. During the high voltage application, anode-side buffer solution is connected to a ground via the anode electrode. High voltage generated by a high voltage power supply unit 15 is applied through connection to the ground via a high voltage wiring, the metal plate of the capillary, the conductive pipe, the cathode-side buffer solution, a capillary strand, the capillary head, the anode-side buffer solution, and the anode electrode.

[Irradiation Unit]

An irradiation light 17 emitted from a light source of an irradiation unit 16 reaches an irradiation detection region 33 of the capillary directly or indirectly via some optical members. Assuming that the number of the capillaries is n, that is, C1, C2, . . . Cn, the irradiation light 17 continuously permeates through the capillaries 31 in the order of C1, C2, . . . Cn in sequence. Information light emitted from the analysis sample irradiated with the irradiation light 17 is detected by a detector 18 directly or indirectly via some optical members so that detection data are output.

In an explanation specifically made with respect to the application for the STR analysis, the irradiation light 17 is a laser light, and the analysis sample is the DNA to which a fluorescent pigment adheres while being amplified in the PCR. The information light is the fluorescence excited by the laser light, and the fluorescent color is a light with base-dependent wavelength. The fluorescent color of the excited fluorescence has light with wavelength (for example, wavelength of laser light) unnecessary for the detection data cut by the filter as the optical member, and is spectrally dispersed into different positions of the detector 18 for the respective wavelengths by a spectroscope as another optical member. When using the detector 18 for imaging, data are detected while having the capillaries C1, C2, . . . Cn separated lengthwise, and the light separated laterally for each wavelength. The detected data are taken into the computer for control operations, and appropriately analyzed by software.

The user allows the control computer to control functions of the device, and to execute delivery and acceptance of data to be detected by the detector 18 in the device. Based on data acquired from the software of the control computer or data acquired from the control computer, the analysis results are derived from the software of another computer for analysis.

In the example, an explanation will be made with respect to the irradiation method for irradiating the irradiation detection regions 33 of the capillaries 31 through which the irradiated light continuously penetrates in sequence. There are various irradiation methods which can be arbitrarily implemented by dividing the irradiation light 17 into sections by the number corresponding to the number of the capillaries 31, or by widening the irradiation light 17 to cover across the width of the aligned capillaries 31 so as to be irradiated individually.

[Thermostat Chamber Unit]

A thermostat chamber unit 19 includes a function for keeping the capillary array 14 at the set temperature. In filling the polymer, the filling speed is increased. In the electrophoresis process, it is effective for keeping the moving speed difference of the analysis sample in electrophoresis constant. FIG. 1 clearly illustrates the inside of the thermostat chamber unit 19. According to the present invention, a wiring route of the capillary array 14 has a three-dimensional plane rather than a two-dimensional plane as illustrated by FIG. 1. It is preferable to employ a space thermostat chamber for the thermostat chamber unit 19, which is configured to allow the heater such as the polyimide heater and the rubber heater to reserve heat of a major part of the capillary strand 31 within the thermostat chamber with high heat insulating property. It is preferable to provide another structure having the fan for circulating air within the thermostat casing for keeping the temperature therein uniform.

It is also possible to employ the contact-type thermostat chamber for reducing the temperature raising time. In this case, a heat reserving board with high heat conductivity, high heat transfer coefficient and high heating value is bent along the wiring route of the capillary array 14 so that the heater with flat surface is applied to the bent heat reserving board. The heat conductive elastomer member for transferring heat generated from the heater while enclosing the capillary strand is applied onto the heater. The heat insulation material may be provided to enclose the capillary with an assembly of the heat reserving board, the heater, and the heat conductive elastomer. In the structure, the application order of the respective members may be determined without restriction.

[Detection Unit]

The detection unit is formed by combining the detector 18 and the optical system elements. Although not shown, the fluorescence is detected by the detector 18 through the multiple optical system elements. The optical system element includes an LP filter for cutting unnecessary irradiation light, and the spectroscope for spectrally disperse the fluorescent wavelength. An arbitrary method may be implemented so long as the respective capillaries 31 and emitted wavelengths are individually detectable by the detector 18. The detector 18 may be in the form of a CCD area image sensor and a CMOS camera, for example.

[Capillary Array Structure]

Figure 3B:
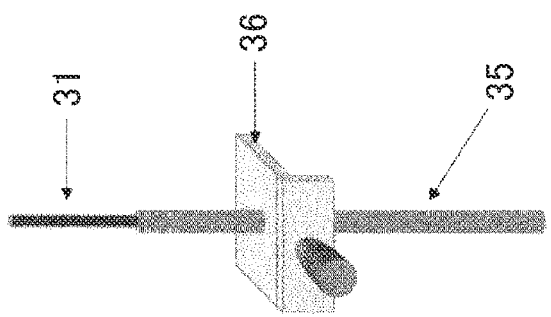
FIG. 3B is a partially enlarged view of a capillary.

Referring to FIG. 3, an explanation will be made with respect to the structure of the capillary array 14 according to the present invention. FIG. 3A is an exploded view of the capillary array 14 as illustrated by FIG. 1. FIG. 3B is a partially enlarged view.

The capillary 31 is formed as a glass tube with internal diameter ranging from several ten microns to several hundred microns, and external diameter of several hundred microns, and has its surface applied with polyimide coating for enhancing strength.

The respective capillaries 31 are cut to have the same lengths, each having a section to be connected to the polymer container 10 covered with a non-conductive substance individually. The covered section is referred to as the capillary head 32. The capillary strand 31 is exposed from an end point of the capillary head 32.

The irradiation detection region 33 of the capillary irradiated with the irradiation light refers to a position at which the irradiation light is irradiated to the inside of the capillary, and at the same time, a position at which the information light emitted from the analysis sample is detected. This section has the polyimide coating removed for efficiently receiving optical energy from the irradiation light, and facilitating detection of the information light from the analysis sample irradiated with the irradiation light. All the irradiation detection regions 33 are aligned and fixed with high accuracy, and bundled with detection holders 34.

The detection holder 34 serves to align and fix the irradiation detection regions 33 with high accuracy. The detection holder 34 has its external shape or the positioning hole processed with high accuracy so as to allow the irradiation unit 16 to irradiate the irradiation detection region 33 with the irradiation light 17, and locate the position for detecting the information light. The thermostat chamber is also provided with a mechanism for fixing the detection holder 34 with high positioning accuracy.

Each end of the capillary strands 31 at the side opposite the capillary head 32 is inserted into each of the conductive pipes 35, and fixed while being exposed, or slightly protruded by approximately 0.5 mm. FIG. 3B illustrates the end of the capillary at the side of the conductive pipe. Each of the conductive pipes 35 is fixed with a separate metal plate 36 individually. Although not illustrated by FIG. 3B, the metal plate 36 and the conductive pipe 35 are partially protected by a load header 37 as a non-conductive substance. The load header 37 for holding the metal plate 36 and the conductive pipe 35 together may be of separate type, single type, or connectable type.

Upon voltage application, the high voltage wiring for supplying power from the high voltage power supply unit 15 comes in contact with the metal plate 36 in the load header 27 so that voltage is applied to the conductive pipe 35 for functioning as the cathode voltage.

Although the above-described structure does not allow individual exchange of the capillary 31, the structure allows the user to obtain easily installable capillary array 14.

The existing capillary array 14 is intended to allow all the multiple capillaries 31 to be subjected to electrophoresis at the same voltage simultaneously. All the conductive pipes 35 are fixed to the single metal plate 36 while being aligned at constant intervals, and further protected by the single load header. At the opposite side, all the capillaries 31 are bundled together, and covered with the single capillary head 32. The foregoing structure only allows the single voltage to be applied to the existing capillary array 31 only simultaneously.

[High Voltage Wiring, High Voltage Power Supply]

Figure 4:
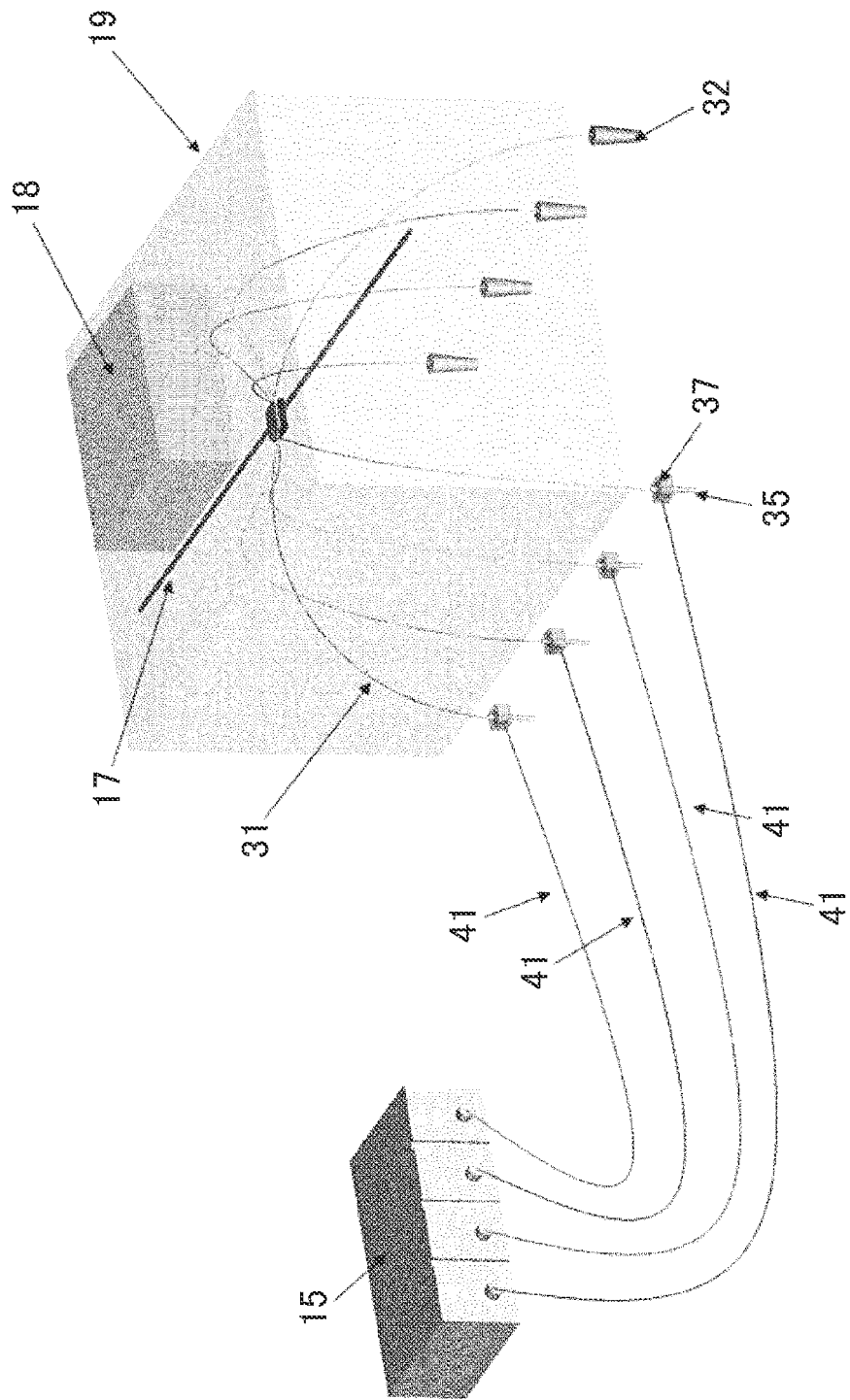
FIG. 4 illustrates connection between a high voltage power supply and capillaries.

Referring to FIG. 4, an explanation will be made with respect to the high voltage power supply and the high voltage wiring according to the present invention.

The existing device includes one high voltage wiring for one high voltage power supply so that high voltage is applied to the multiple capillaries via the metal plate. Depending on the electrophoresis process step, the magnitude of required voltage becomes different. As the voltage also depends on the application targeted by the user or the analysis sample concentration, outputs are adjustable in detail (variable output) so that the user determines the setting.

On the contrary, in the present invention, aiming at execution of electrophoresis of the multiple capillaries 31 at different timings, the conductive pipes 35 of the capillaries are provided with the metal plates 36, respectively as described referring to FIG. 3. Accordingly, multiple high voltage wirings 41 are necessary for applying the voltage from the high voltage power supply unit 15 to the capillaries 31. The high voltage power supply unit 15 is configured to apply voltage to the capillaries 31 individually in accordance with the respective electrophoresis process steps. As the expendable capillary is to be exchanged, it is preferable to configure the high voltage wiring 41 to allow its end at the side connected to the capillary to be easily attached to or detached from the capillary. More specifically, a plug is manufactured to have its tip of a columnar section of the conductive member processed into a semi-spherical shape. The conductive wire of the high voltage wiring 41 is connected to the plug. The plug is then assembled as an operation plug while being thrusted by the spring. The operation plug passes through a connection port attached to the load header 37 of each of the capillaries 31, and is stopped in abutment on the metal plate 36. At this time, each of the casing of the operation plug and the load header 37 is made of the insulation material to prevent discharge from the channel other than the conductive wire, the plug, and the metal plate. For example, the elastomer with high insulation property may be interposed between the operation plug and the load header. The above-described structure allows high voltage application to the respective capillaries 31 without discharging to the outside while allowing the detachable connection between the operation plug of the high voltage wiring 41 and the load header 37 of each of the capillaries 31.

Figure 5:
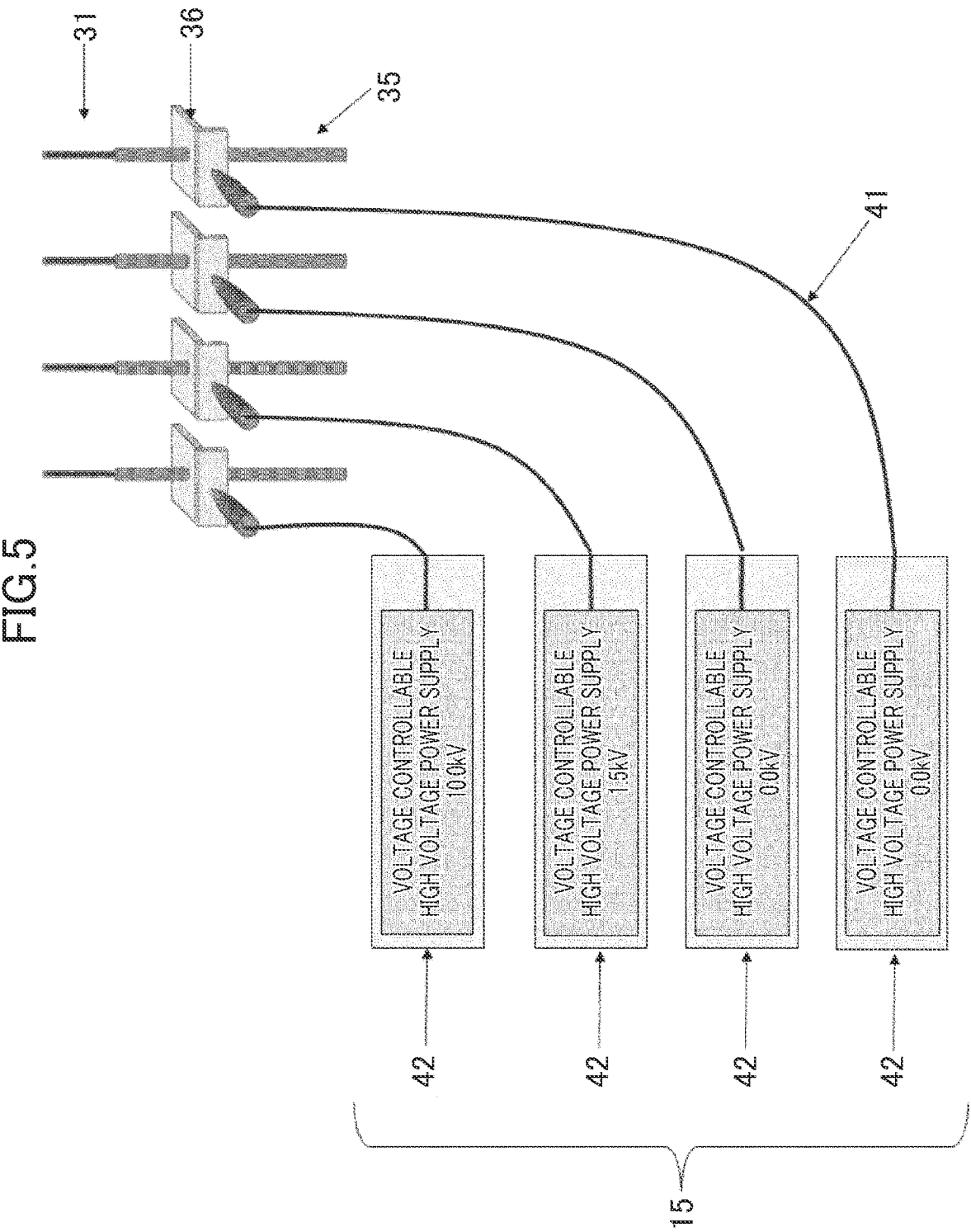
FIG. 5 illustrates high voltage control operations according to a first example.

FIG. 5 illustrates one of examples for controlling the high voltage power supply unit 15 as illustrated by FIG. 4.

Providing individually voltage controllable high voltage power supplies 42 by the number corresponding to that of the capillaries 31 allows easy configuration of the high voltage power supply unit 15 according to the present invention. The example provides advantageous effects of easy control operations and easy development.

[Example of Data Acquisition Process in Device Intended to Conduct STR Analysis]

An explanation will be made with respect to an exemplified case of simplifying the process executed from the step in which the user acquires the specimen sample to the step in which the device obtains data in the pretreatment-integrated electrophoresis device of the example, which is configured to integratedly execute the pretreatment process and the electrophoresis process for nucleic acid analysis, taking the STR analysis as an example.

Step 0: The user collects the specimen sample as the cell in the oral cavity of a testee using the swab, or the biological cell such as the blood sample using the kit.

Step 1: The user charges the specimen sample into the cartridge 06. The sample is mixed with Lysis Buffer in the cartridge 06 to extract DNA from the biological cell.

Step 2: The user places the cartridge 06 on the pretreatment unit 03.

Step 3: The pretreatment unit 03 feeds fixed quantity of the DNA sample solution which has been extracted from Lysis Buffer in the cartridge 06. The solution is further mixed with Primer Mix and Master Mix, which have been sealed in the cartridge 06.

Step 4: The heating/cooling unit 11 heats and cools the cartridge 06 for heating and cooling mixtures of the extracted DNA sample, Primer Mix, and Master Mix repeatedly in the cartridge. Basically, heating/cooling temperatures, the time period, and the number of cycles will be determined in accordance with protocol of the PCR reagent to be used.

Step 5: The liquid obtained subsequent to the PCR is denatured into single stranded as the analysis sample. In general, the manually executed process steps are automated by quantifying the liquid obtained subsequent to the PCR, mixing a part of the liquid with formamide, and heating the mixture. In the process of quantifying the DNA concentration, preferably, a fixed amount of beads for adsorbing DNA is sealed in the cartridge 06, and the DNA separated from the beads is quantified. When quantifying the liquid volume rather than the DNA concentration, the fixed quantity of the liquid from the whole quantity obtained subsequent to PCR is fed to a different location in the cartridge 06 for storage, and further mixed with formamide. In the case of sufficiently wide dynamic range of the detection unit of the device, the liquid may be mixed with formamide without quantification as described above. Preferably, in another example, when the liquid is sufficiently denatured into single stranded only by mixture with formamide, the heating process may be omitted. In the preferred example, DNA may be denatured into single stranded only by conducting thermal denaturation through heating. In a still further preferred example, the heating step is only executed without using formamide.

Step 6: The device operates the autosampler 02 to connect the waste liquid container 08 to one side of the capillary, and the polymer container 10 to the other side of the capillary. Referring to FIG. 1, the capillary at the side of the conductive pipe 35 is connected to the waste liquid container 08, and the capillary head 32 is connected to the polymer container 10. It is also possible to connect the capillary head to the waste liquid container 08, and the conductive pipe 35 to the polymer container 10.

Step 7: The device operates the autosampler 02 to make the conductive pipe 35 wetted in the cathode-side buffer solution container 07, and the capillary head 32 wetted in the anode-side buffer solution container 09.

Step 8: The device applies voltage ranging from approximately −15 kV to −20 kV to the capillary 31 for the purpose of executing the process called PreRun for improving the separation performance upon measurement by discharging ions of polymer charged into the capillary 31. The voltage is applied from the high voltage power supply unit 15 to polymer within the capillary via the high voltage wiring 41, the load header 37, the conductive pipe 35, and the cathode-side buffer solution container 07. At this time, at the side of the capillary head 32, the anode electrode is made wetted in the anode-side buffer solution container 09 for discharging to the earth.

Step 9: The device operates the autosampler 02 to make the conductive pipe 35 wetted in the analysis sample in the sample well of the cartridge 06, and make the capillary head 32 wetted in the anode-side buffer solution container 09.

Step 10: The device applies voltage ranging from 0.5 kV to 2.0 kV to the capillary 31. Electrophoresis process of the analysis sample is executed from the connection port of the cartridge 06 into the capillary 31. In the series of steps at least up to the step 10, the thermostat chamber unit 19 is required to stabilize the temperature by keeping the capillary 31 at the constant temperature.

Step 11: Similarly to step 7, the autosampler is operated to make the conductive pipe 35 of the capillary wetted in the cathode-side buffer solution container 07, and the capillary head 32 at the other side wetted in the anode-side buffer solution container 09.

Step 12: The high voltage power supply unit 15 applies voltage ranging from 8.0 kV to 12.0 kV to the capillary 31. The analysis sample moves in the capillary 31 filled with polymer from the side of the conductive pipe 35 to the side of the capillary head 32 (electrophoresis).

Step 13: The device allows the irradiation unit 16 to irradiate the irradiation detection regions 33 of the capillaries 31 with the irradiation light 17. As the irradiation detection regions 33 of the capillaries 31 are accurately aligned by the detection holders 34, the irradiation light penetrating through the first capillary 31 will make incident on the next capillary 31 to penetrate therethrough. The incident and penetration will repeat until the irradiation light 17 penetrates through all the capillaries 31, and is absorbed in the device to stop irradiation.

Step 14: The analysis samples moving through electrophoresis reach the irradiation detection regions 33 of the capillaries sequentially. The irradiation light 17 allows the fluorescent pigment labelled to the analysis sample to emit light. The labelled fluorescent color becomes different depending on the base of the analysis sample.

Step 15: The detection unit detects the emitted fluorescence. The fluorescence is detected by the detector 18 via the multiple operation system elements of the device. The optical system element includes the LP filter for cutting unnecessary irradiation light, and the spectroscope for spectrally dispersing the fluorescent wavelength. However, an arbitrary method may be implemented so long as the respective capillaries 31 and emitted wavelength are individually detected by the detector 18.

In the steps 8, 10, and 12 to 15 for executing electrophoresis, the anode electrode is wetted in the liquid of the anode-side buffer solution container 09. At this time, the anode-side buffer solution is connected to the ground via the anode electrode. The high voltage generated by the high voltage power supply unit 15 is applied through connection to the ground via the high voltage wiring 41, the metal plate 36 of the capillary, the conductive pipe 35, the cathode-side buffer solution, the capillary strand 31, the capillary head 32, the anode-side buffer solution, and the anode electrode.

In the foregoing example, the device executes the process up to the step 15 to obtain the detection data. At this time, in the process of step 0, the user acquires the specimen sample. In the process from steps 1 to 5, the pretreatment process is executed. In the process from steps 6 to 15, electrophoresis process is executed. Actually, subsequent process exists, which includes the step where the detection data obtained in the step 15 are analyzed and displayed using software, and the step in which the user stores data. Those steps will not be described herein because they are unnecessary for description of the present invention.

Each of individual process steps from 0 to 15 has been described. Actually, some of those steps may be executed simultaneously so that the TAT is further reduced. Both the process from steps 1 to 5 corresponding to the pretreatment process, and the process from steps 6 to 8 corresponding to the electrophoresis process have to be finished before starting the step 9. Therefore, the step 6 does not have to be necessarily executed subsequent to execution of the step 5. It is possible to execute those steps simultaneously.

Simultaneous execution of some steps of the pretreatment process and the electrophoresis process is a preferred case to which the example is applied for reducing the TAT. Specifically, the process from steps 6 to 8 is executed during the PCR in the step 4 requiring relatively long processing time (19.7 minutes for 31 cycles according to the multiplex STR reagent protocol), and control operations of raising temperature of the thermostat chamber, and stabilizing temperature are executed as described in step 10.

[Actual Operation in First Example]

Figure 6:
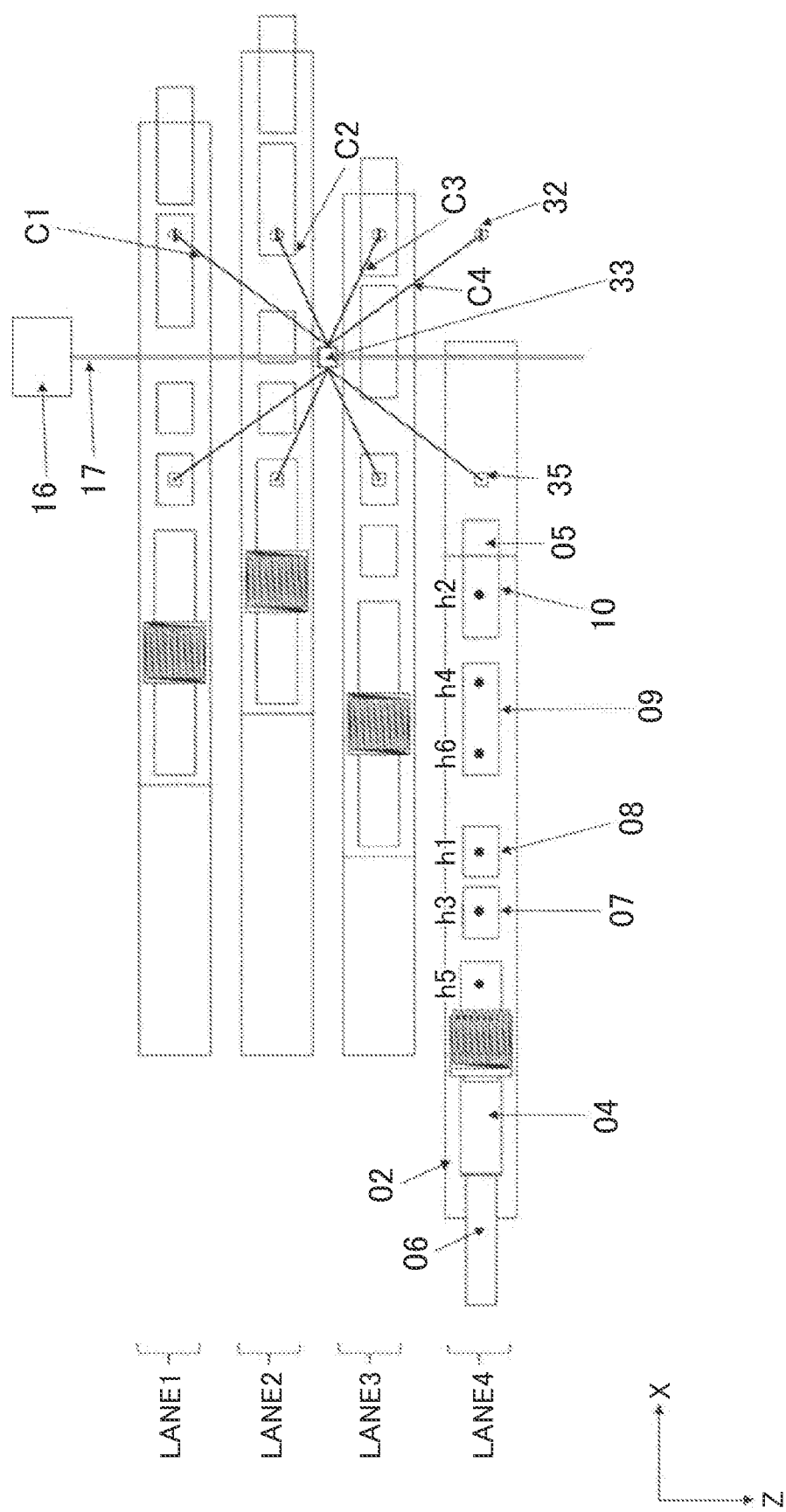
FIG. 6 is a top view of the pretreatment-integrated electrophoresis device.

FIG. 6 is a top view of the pretreatment-integrated electrophoresis device 1. Referring to FIG. 6, an explanation will be made with respect to the advantageous effect of the present invention, that is, individual execution of electrophoresis on each of the cartridges 06. Actually, the device includes the high voltage power supply, the high voltage power supply wiring, the detection unit, and the thermostat chamber unit. However, the drawing omits those components for easy visibility.

Firstly, an explanation will be made with respect to operations for arranging the capillaries 31 by the autosampler 02 in the electrophoresis process as described above.

Although omitted in FIG. 1, Lane 4 only shows connection ports provided for the waste liquid container 08, the polymer container 10, the cathode-side buffer solution container 07, the anode-side buffer solution container 09, the cartridge 06, and the cartridge cover 04, respectively for connection to the capillaries 31. The connection port of the waste liquid container is denoted by h1, the connection port of the polymer container is denoted by h2, the connection port of the cathode-side buffer solution container is denoted by h3, the connection ports of the anode buffer solution is denoted by h4 and h6, and the connection port of the cartridge and the cartridge cover is denoted by h5.

An explanation will be made with respect to the capillary 31 and the connection port in the above-described electrophoresis process. In the step 6, the conductive pipe 35 comes in contact with the connection port h1 of the waste liquid container 08, and the capillary head 32 comes in contact with the connection port h2 of the polymer container 10.

In the steps 7, 8, and 11 to 15, the conductive pipe 35 comes in contact with the connection port h3 of the cathode-side buffer solution container 07, and the capillary head 32 comes in contact with the connection port h4 of the anode-side buffer solution container 09.

In steps 9 and 10, the conductive pipe 35 comes in contact with the connection port h5 of the cartridge 09 and the cartridge cover 04, and the capillary head 32 comes in contact with the connection port h6 of the anode-side buffer solution container 09.

Assuming that a distance x1 between the conductive pipe 35 and the capillary head 32 of the capillary is fixed during operation of the device, each distance between h1 and h2, h3 and h4, and h5 and h6 is equal to the distance x1. An arrangement of those connection ports h1, h2, h3, h4, h5 and h6 in a single row in the X-axis direction allows the drive axis of the autosampler 02 conventionally requiring the triaxial of XYZ-axis in the existing device to have the biaxial XY drive axis. This makes it possible to provide the low-cost device for the user.

The X-axis refers to the linear direction formed by connecting sample wells (or sample tube to be described later) of the cathode-side buffer solution container 07 and the cartridge 06. The Z-axis refers to the direction parallel to an installation plane of the device and orthogonal to the X-axis. The Y-axis refers to the direction orthogonal to the X-axis and the Z-axis. In the drawing of the example, all the autosamplers 02 are aligned in the Z-axis direction, and the multiple capillaries 31 are aligned in the same direction along the X-axis. Correctly, the XZ axis is determined for the single capillary. If the multiple capillaries 31 have different X-axis directions (for example, radial direction), each X-axis of the respective autosamplers 02 follows the X-axis direction defined by connecting the capillary head 32 and the conductive pipe 35 of the capillary 31.

In the drawing, it is assumed that C1 is the uppermost capillary, and C4 is the lowermost capillary. Each code Lane denotes an operation unit which allows individual execution of electrophoresis in the device including the autosampler 02, various component groups installed on the autosampler 02, and the capillaries 31. The operation unit using the capillary C1 corresponds to Lane1, and the operation unit using the capillary C4 corresponds to Lane4.

Referring to FIG. 6, the Lane1 is executing the steps 14 and 15 subsequent to execution of steps 1 to 13. The irradiation light 17 emitted from the irradiation unit 16 irradiates the irradiation detection region 33 of the capillary C1. The analysis sample moving in polymer through electrophoresis emits the information light so as to be detected by the detector 18. Voltage of 10 kV is applied for electrophoresis.

Subsequent to the Lane1, Lane2 is executing the step 10 after finishing execution of steps 1 to 9. The conductive pipe 35 of the capillary is connected to the connection port h5 of the cartridge 06 so that the analysis sample is injected into the capillary C2. As the Lane1 is in operation, the irradiation light 17 has reached the capillary C2 after penetrating through the capillary C1. The detection unit executes imaging of the C2. However, as the Lane1 has not reached the step 14 onward, the acquired detection data will be continuously discarded until the Lane2 reaches the step 14. Voltage of 1.5 kV is applied for injecting the sample.

Subsequent to the Lane2, Lane3 is executing the step 6 after finishing execution of the steps 1 to 3 while repeating the PCR in step 4. In the similar case to the Lane2, the irradiation light 17 has reached the capillary C3 after penetrating through the capillaries C1, C2, and the acquired detection data will be continuously discarded until the Lane3 reaches the step 14. The applied voltage is 0 kV.

Subsequent to the Lane3, the Lane4 is executing the step 2 in which the user is loading the cartridge 06. Similarly to the Lane2 and Lane3, the irradiation light 17 has reached the capillary C4 after penetrating through the capillaries C1, C2 and C3. As the Lane4 is not executing the step 6, polymer is not newly filled. As the polymer which has been used in the previous cycle is remained in the capillary C4, the scattered light which generates the measurement noise is hardly emitted. Similarly to the Lane2 and Lane3, the acquired detection data will be continuously discarded until the Lane4 reaches the step 14. The applied voltage is 0 kV.

The capillary C4 has polymer used in the previous cycle remained. However, when using the device for the first time, or after exchanging the capillary, polymer is filled into all the capillaries to suppress emission of the scattered light in spite of the case of using the single capillary for executing electrophoresis of the analysis sample.

Although not illustrated for easy visibility, the voltage corresponding to each Lane is applied from the high voltage power supply unit 15 via the high voltage wiring 41. The thermostat chamber unit 19 is stabilized under temperature control at 60° C.

[Relation Between Component Control and Data in First Example]

Figure 7:
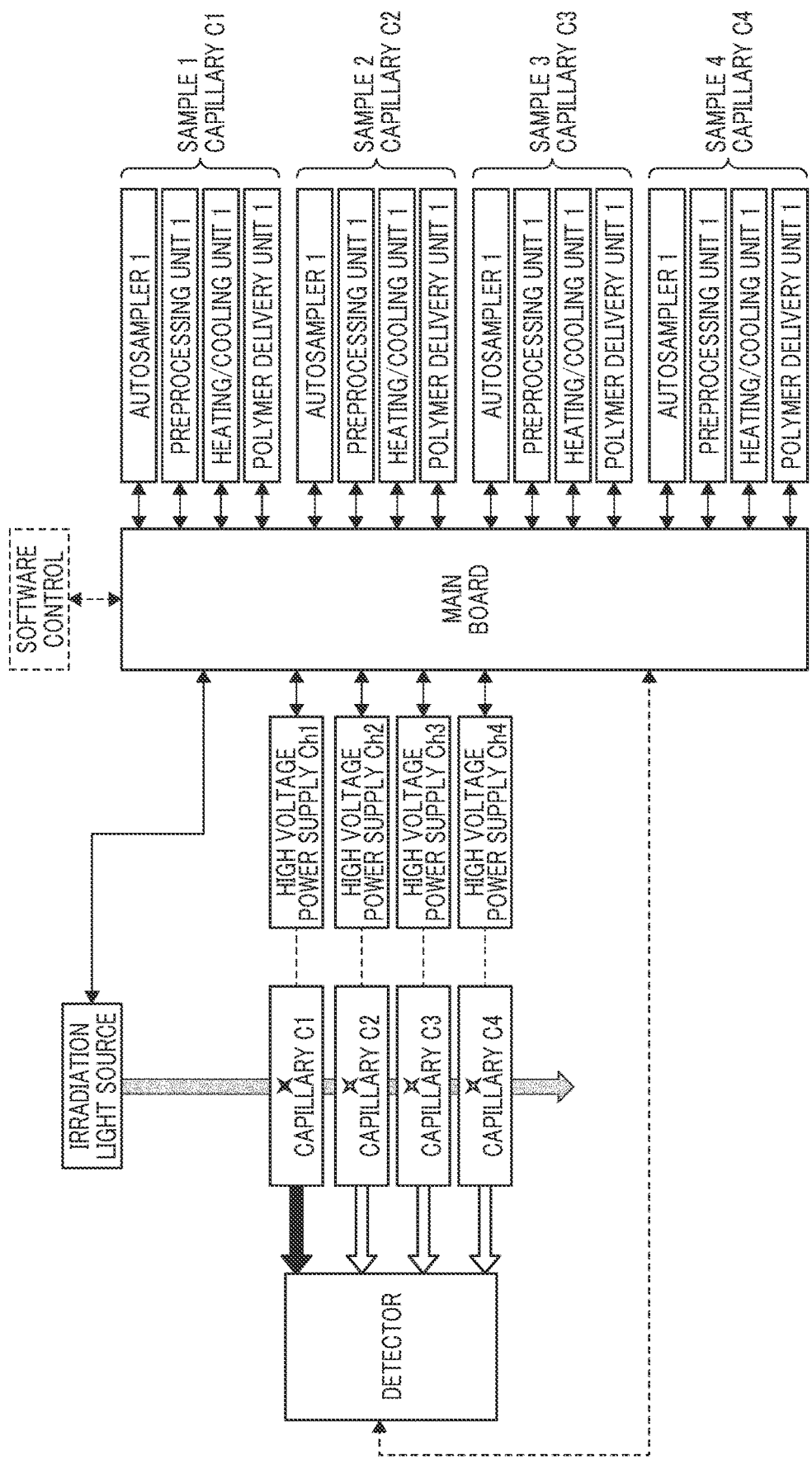
FIG. 7 illustrates an information processing system.

FIG. 7 illustrates interaction through information in the first example. Thin solid lines indicate interaction of control information, detected data, power supply, and the like. Dotted lines indicate application of electricity from the high voltage power supply. A bold arrow indicates an optical information flow. The control information includes general bidirectional electric signals corresponding to operation instruction to the respective units, measurement values from the respective units, and completion of execution.

Although not illustrated in FIGS. 1 to 6, the actual device control is executed mainly by the main board as the electric substrate installed on the device. FIG. 7 simply illustrates the direct exchange of the control information between the main board and the components for easy understanding. A relay substrate may be interposed between the main board and the component if such use is more advantageous than the use of the single wiring for connection between the main board and the component. The software has to be controlled for managing operations of those components, thus requiring the internal computer installed in the device while being directly connected to the main board, or an external computer for controlling the device externally. Software Control indicated in FIG. 7 includes such computer.

As has been described with respect to the first example, the STR analysis is one of exemplary cases, and it is not intended to limit the scope of the present invention.

Second Example

<Example of Polymer Injection Using Pump>

Figure 8:
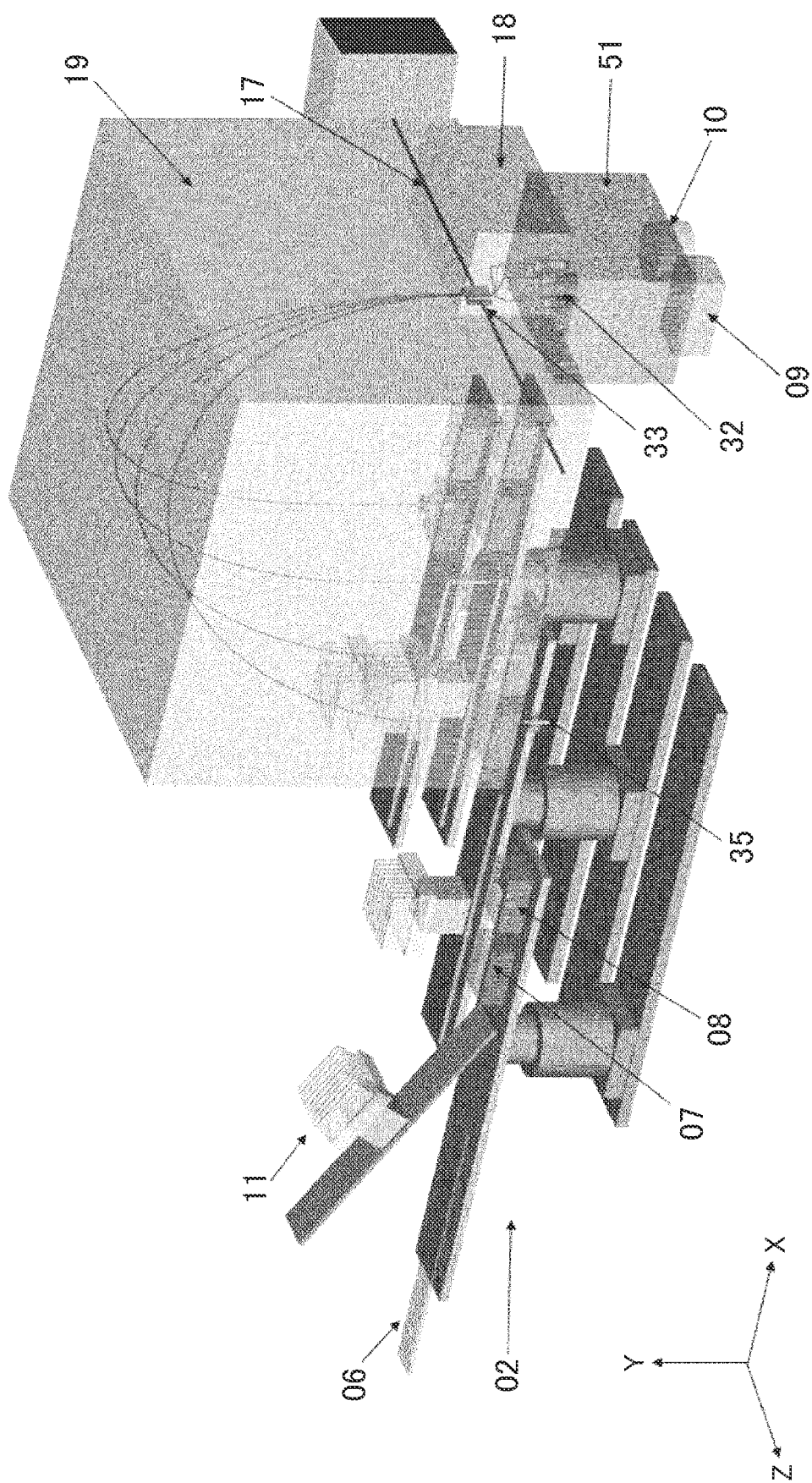
FIG. 8 is a perspective view of a pretreatment-integrated electrophoresis device according to a second example.

Referring to FIG. 8 illustrating a structure of the pretreatment-integrated electrophoresis device 01, an explanation will be made with respect to another example for implementing the present invention, which is different from the first example.

In this example, structures of the autosampler 02, the cartridge 06, the cartridge cover 04, the heating/cooling unit 11, the waste liquid container 08, and the cathode-side buffer solution container 07 are similar to those of the first example. Although not shown, the device also includes components such as the pretreatment unit, the high voltage power supply, the high voltage wiring, the anode electrode, the control computer, and the main board.

The example is characterized in that a pump unit 51 installed on the device instead of the polymer delivery unit. The pump unit 51 to be described later in detail includes a polymer flow path block, a liquid feeder, an anode-side valve, a liquid feeder-side valve, and a check valve. The pump unit 51 is connected to the capillary array 14, the polymer container 10, and the anode-side buffer solution container 09.

The structure provides two main advantageous effects. The device cost is the first advantageous effect. In the first example, the polymer delivery units each as the driving source are provided corresponding to the respective capillaries 31. In the example, polymer may be injected using the pump unit as the single unit of the driving source.

The analytical performance is the second advantageous effect. In the example, the capillary heads 32 do not have to be divided corresponding to the autosamplers 02 of the respective Lanes. They are gathered and connected in the pump unit 51. It is therefore possible to reduce the distance between the irradiation detection region 33 of the capillary array 14 and the capillary head 32 to significantly short unlike the first example. If each length of the capillaries 31 is the same, sample separation performance as one of analytical performances is improved as the length of the capillary from the tip end at the side of the conductive pipe 35 to the irradiation detection region 33 becomes longer. In accordance with the modification, positions of the irradiation light 17, the thermostat chamber unit 19, and the detector 18 are changed as illustrated by the drawing.

Figures 9, 10:
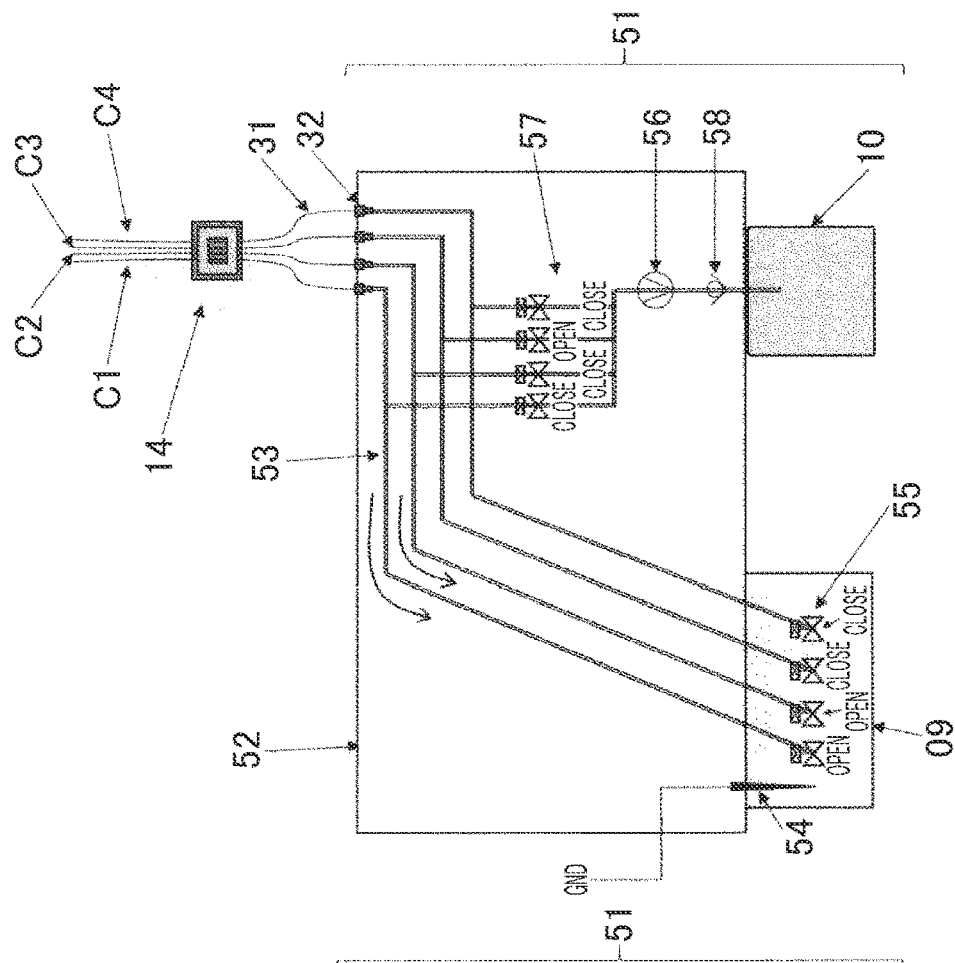
FIG. 9 illustrates a pump unit of the second example.
FIG. 10 illustrates an electric current in the pump unit of the second example.

FIG. 9 illustrates an example of the specific structure of the pump unit 51 as illustrated in FIG. 8. A polymer flow path block 52 made of insulation material has independent flow paths 53 by the number n corresponding to the number n of the capillaries. The single anode-side buffer solution container 09 is connected to the n independent flow paths. The anode-side buffer solution container 09 is connected to the single anode electrode 54 in the polymer flow path block 52. The anode electrode 54 is connected to the ground of the device while passing through the inside of the polymer flow path block 52. The anode electrode 54 may be arbitrarily structured without being connected to the polymer flow path block so long as it is disposed in the device while having one side connected to the ground and the other side ready to be connected to the n anode-side buffer solution containers individually.

The anode-side buffer solution container 09 is detachable from the polymer flow path block 52 to allow exchanging operations by the user.

The n flow paths 53 are connected to the anode-side buffer solution container 09. Anode-side valves 55 are provided on the respective flow paths at the respective connection end points. Opening and closing timings of those valves may be controlled by the software.

The other ends of the flow paths 53 are connected to the capillary heads 32, respectively. In order to inject polymer into the capillary array 14 through the capillary heads 32 from the flow paths 53 individually, each connection has to be sealed and resistant to the pressure. Specifically, it is preferable to implement the connection method by providing the capillary head 32 with screw structure and the polymer flow path block 52 with a tap, and the method by using a cap structure for pressing the capillary heads 32 subsequent to connection to the polymer flow path block 52.

Another flow path is provided between both end points of each of the flow paths so that the flow path 53 forms a three-forked structure within the polymer flow path block. The newly provided flow path is disposed independently, and linked with the liquid feeder 56. The liquid feeder 56 is linked with the polymer container 10. As the capillary strand 31 has its piping diameter extremely smaller than that of the flow path, the anode-side valve 55 is opened to feed polymer from the liquid feeder 56 so that the resultant pressure difference serves to feed the polymer to the anode-side buffer solution container 09. When the anode-side valve 55 is closed to feed the polymer from the liquid feeder 56, the polymer flows into the capillary strand 31 slowly under high pressure. The polymer further flows into the cathode-side buffer solution container 07 in the end.

A high pressure pump for driving plungers is suitable for the liquid feeder 56. In a simple case, the syringe-shaped container having the plunger may be assembled with the driving structure using a ball screw for driving the plunger. The structure similar to the one as described above has been well known. The liquid feeder 56 may be arbitrarily configured so long as it ensures to generate pressure sufficient to inject the separation medium with high viscosity to the internal diameter of the capillary 31, and has sealing properties to allow injection with no leakage.

As FIG. 9 illustrates, each of the flow paths 53 linked with the liquid feeder 56 is provided with a liquid feeder-side valve 57, and the flow paths are joined to one junction flow path. Preferably, the junction flow path is linked with the liquid feeder 56, and the liquid feeder 56 is linked with the polymer container 10. Another method may be simply implemented by disposing n units of liquid feeders 56 for n capillaries, respectively.

FIG. 9 illustrates an operation state of the device as illustrated in FIG. 8, which is similar to the one in the first example as illustrated in FIG. 6. That is, the device has four capillaries 31 in total. Voltage of 10 kV is applied to the Lane1 corresponding to the capillary C1. Voltage of 1.5 kV is applied to the Lane2 corresponding to the capillary C2. Polymer is injected into the Lane3 corresponding to the capillary C3. The Lane4 corresponding to the capillary C4 is in the process for exchanging the cartridge.

Referring to FIG. 9, as voltage is applied to each of the capillaries C1 and C2, the anode-side valves 55 are opened, and the liquid feeder-side valves 57 are closed. In this state, the applied voltage is applied through polymer from the flow path end points at the anode-side valve. The electric current is discharged to the ground while flowing to the anode electrode through the anode-side buffer solution.

In the steps 8, 10, and 12 to 15 of the electrophoresis process as described in the first example, high voltage generated by the high voltage power supply 42 is applied through connection to the ground via the high voltage wiring 41, the metal plate 36 of capillary, the conductive pipe 35, the cathode-side buffer solution 07, the capillary strand 31, the capillary head 32, the inside of the flow path 53 of the polymer flow path block, the anode-side buffer solution 09, and the anode electrode 54. This example differs from the first example in that the respective flow paths 53 of the polymer flow path block are disposed between the capillary heads 32 and the anode-side buffer solution 09.

The capillary C3 of the Lane3 is in the polymer injection process. Polymer injection is performed by executing two process steps. In the former process step, the anode-side valve and the liquid feeder-side valve 57 are opened to drive the pump of the liquid feeder 56. Polymer is then discharged into the anode-side buffer solution container 09 to fill the flow path between the polymer container 10 and the anode-side buffer solution container 09 with polymer. In the latter process step, the anode-side valve 55 is closed to drive the liquid feeder 56 so that polymer is injected into the capillary C3. FIG. 9 illustrates the latter process step.

The Lane4 is in the process for exchanging the cartridge 06 while having the anode-side valve 55 and the pump-side valve 57 closed.

The check valve 58 serves to prevent backflow of polymer from the liquid feeder 56 to the polymer container 10 upon suction and discharge operations of the liquid feeder 56. If the function of the check valve 58 is imparted to the liquid feeder 56, the check valve 58 is not necessary.

In the structure as illustrated by FIG. 9, all the n capillaries 31 are connected to the inside of the single anode-side buffer solution container 09 via the flow paths 53 of the polymer flow path block of the pump unit 51. Upon application of high voltage to one of the capillaries 31, the electric current from the anode-side buffer solution 09 is connected to the anode electrode 54 via the above-described route, and discharged to the ground. Most part of electric current flows to the zero-potential ground. The anode-side buffer solution 09 contains the flow path connected to the other capillary. Theoretically, backflow of the electric current to the other capillary 31 possibly occurs.

FIG. 10 schematically represents the structure for calculating electric current which flows backward, while defining the electric current flowing to the Lane1 as $I_1$, the electric current flowing to the Lane2 as $I_2$, and the electric current flowing backward to the Lane3 as $I_3$. Each voltage applied to the Lane1 is 10 kV, applied to the Lane2 is 1.5 kV, and applied to the Lane3 and Lane4 is 0 kV. It is assumed that the resistance against the channel of the anode-side buffer solution 09, the anode electrode 54, and the ground is denoted by a wiring resistance r, the voltage applied to the wiring resistance r is denoted by v, and the resistance against the capillary and the flow path of the Lane3 is denoted by $R_3$. The electric current easily flows through the anode-side buffer solution 09, and the wiring resistance r is approximately 10 mΩ. As the pipe diameter of the capillary 31 is small, the resistance $R_3$ is approximately 10 MS). The equation of $I_1+I_2=100$ μA is substituted to the formula of $v=r\times(I_1+I_2)$ to obtain $I3=v/R_3$. Therefore, the electric current backflow $I_3$ is approximately $10^{-15}$ A. This shows that the significantly weak electric current flows to the Lane3. This applies to the Lane4 because of the same pipe diameter of the capillary 31. The electric current from the Lane1 flows backward to the Lane2. The electric current flowing backward to the Lane2 is theoretically very weak compared with the value of the electric current flowing to the Lane2 at 1.5 kV. The resultant influence on electrophoresis process is substantially negligible. If it is still required to prevent the electric current backflow, it is preferable to install a backflow prevention circuit formed by assembling electronic components such as diode and capacitor with the high voltage power supply unit 15 for applying high voltage to the capillaries 31.

The drawing indicates that connection of the polymer container 10 and polymer contained therein to the ground causes the electric current backflow while bypassing the wiring resistance of the capillary 31. When using the pump unit 51, it is desirable not to bring the polymer container 10 into contact with the ground. Specifically, preferably, the polymer container 10 is connected only to the pump unit so as not to come in contact with the device casing, or the non-conductive substance such as plastic may be used as a support.

Third Example

<Another Example of Polymer Injection Using Pump>

Figure 11:
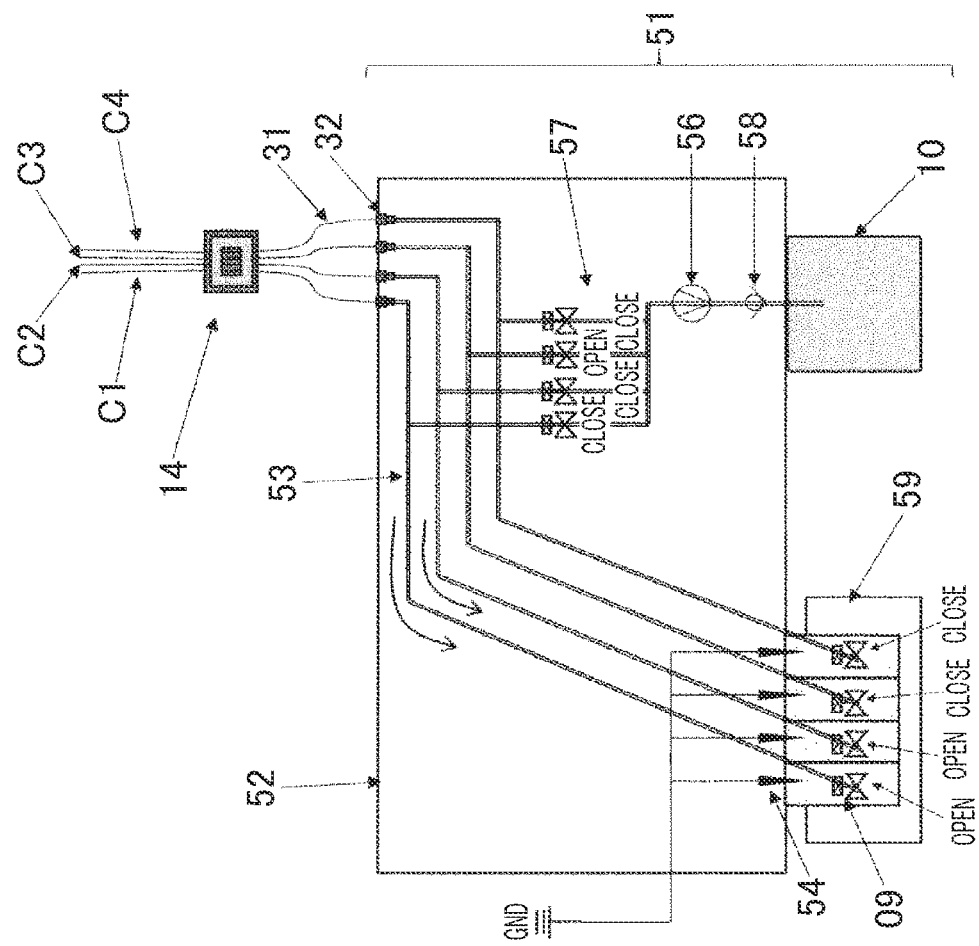
FIG. 11 illustrates a pump unit of a third example.

Lowering of electrical resistivity of the capillary 31 gives larger influence on electrophoresis as a result of the electric current backflow. Specifically, larger pipe diameter of the capillary 31, shorter pipe length of the capillary 31, and increase in the number of the capillaries 31, the use of polymer with low electric resistance may be factors to give larger influence on electrophoresis as a result of the electric current backflow. FIG. 11 illustrates another example of the specific structure of the pump unit as illustrated by FIG. 8 for preventing backflow of the very weak electric current as obtained referring to FIG. 10 so that those devices as described above are provided.

Similarly to FIG. 9, the polymer flow path block 52 made of insulation material includes the independent flow paths 53 by the number n corresponding to the n capillaries. This example differs from the one illustrated by FIG. 9 in that the n anode-side buffer solution containers 09 are individually connected to the n flow paths 53. The n anode-side buffer solution containers 09 are individually connected to the n anode electrodes 54 of the polymer flow path block 52.

The anode-side buffer solution container 09 is detachable from the polymer flow path block 52 to allow the user to carry out exchanging operations. In order to reduce the time and labor of the user to carry out the exchanging operations, the multiple anode-side buffer solution containers 09 are disposed in a single holder 59 as illustrated by FIG. 11. It is possible to prepare one container which is divided into n inner sections each filled with the anode-side buffer solution.

The n flow paths are individually connected to the anode-side buffer solution containers 09. At the respective connection end points, the anode-side valves 55 are provided on the respective flow paths to allow the software to control the opening and closing timing of each valve.

In the above-described structure, the anode-side buffer solution containers 09 are separated for the Lanes and the capillaries. This makes it possible to provide the device configured to prevent backflow of electric current for the user.

Fourth Example

<Another Structure of High Voltage Power Supply>

Figure 12:
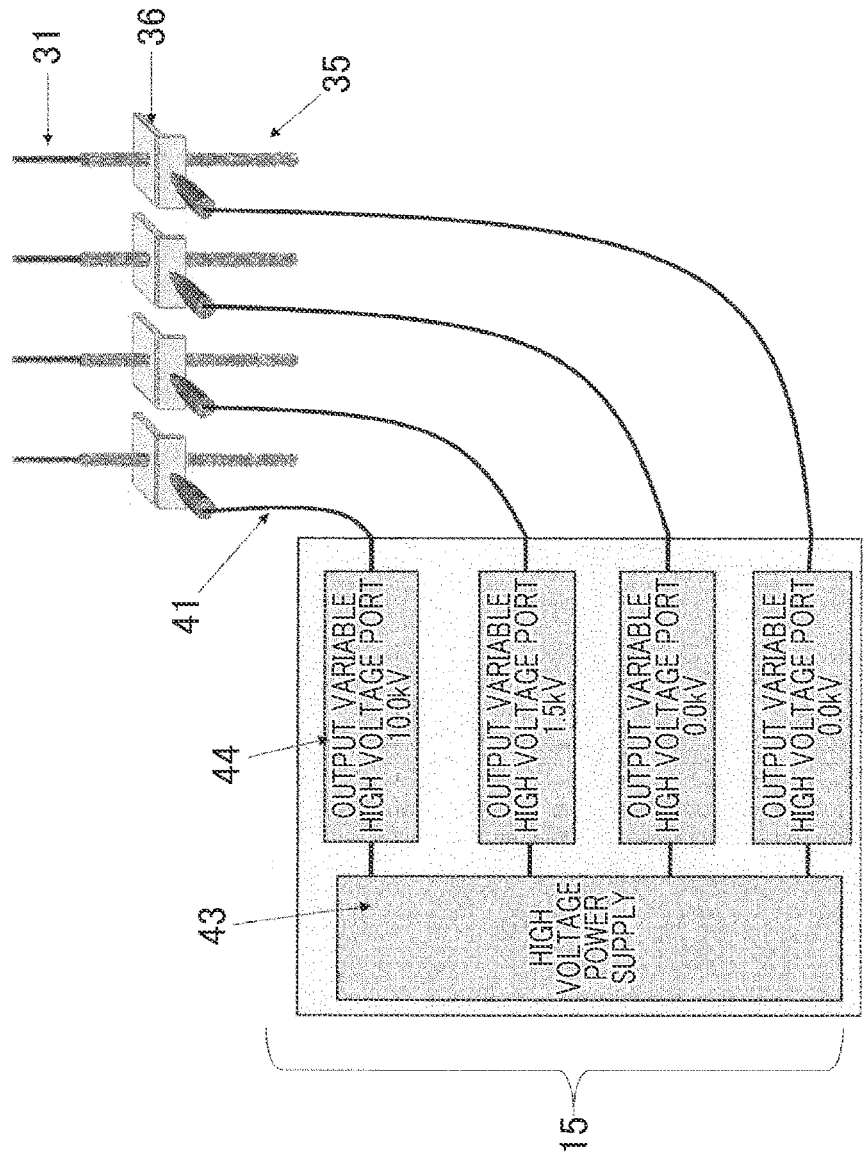
FIG. 12 illustrates high voltage control operations according to a fourth example.

FIG. 12 illustrates another example of the high voltage power supply unit 15 for high voltage control as illustrated by FIG. 5.

In the structure, the single unit of the high voltage power supply 43 includes output variable high voltage ports 44 by the number corresponding to the number of capillaries. Although it is difficult to develop the high voltage power supply unit 15 depending on the number of the capillaries, it is more effective for space saving and low introduction cost than individual provision of the high voltage power supplies 42.

Fifth Example

<Another Structure of High Voltage Power Supply>

Figure 13:
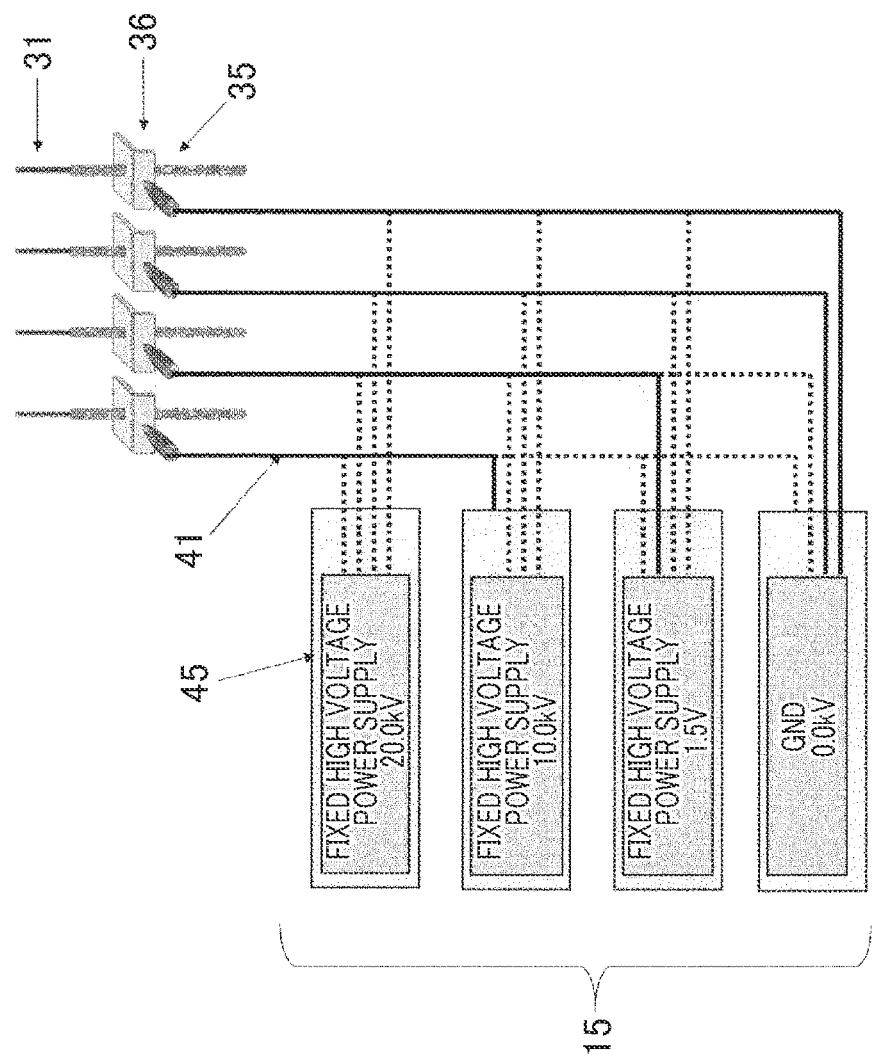
FIG. 13 illustrates high voltage control operations according to a fifth example.

FIG. 13 illustrates another example of the high voltage power supply unit 15 for high voltage control as illustrated by FIG. 5.

In the structure, output fixed high voltage power supplies 45 each having fixed output are prepared. When providing the machine dedicated to the single application such as the STR analysis through application of the present invention, the application is fixed, and a range of the sample concentration is narrowed to a certain extent. Then the required voltage in the voltage application steps 8, 10, 12 of the electrophoresis process is determined as described in the first example. Assuming that three different high voltages are required, three types of fixed high voltage power supplies are prepared, and four high voltage wirings 41 are prepared for the respective capillaries, including one for GND at 0 kV. In the process, high voltage is mechanically or controllably applied in accordance with the voltage application step.

In this structure, as an output of the high voltage power supply is not variable but fixed for each unit, it is advantageous for easy development of the high voltage power supply at low costs.

Sixth Example

<Another Structure of High Voltage Power Supply>

Figure 14:
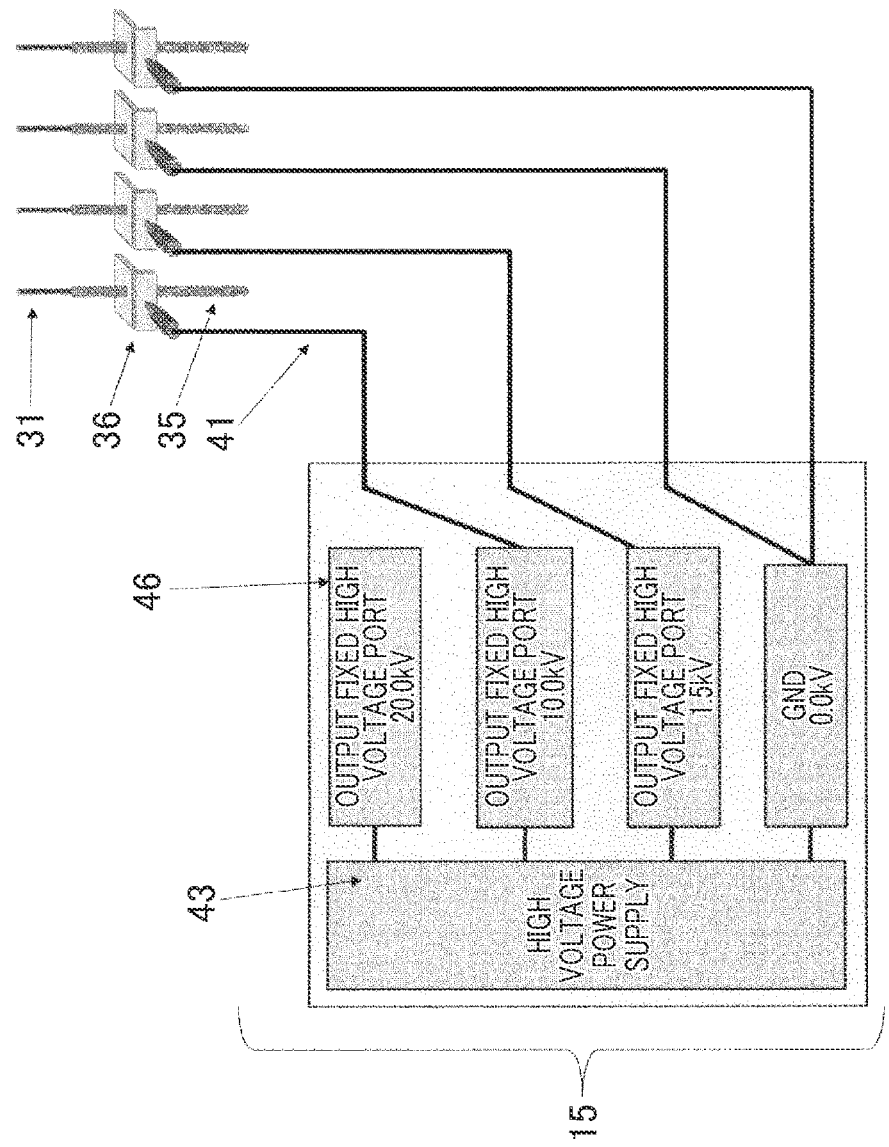
FIG. 14 illustrates high voltage control operations according to a sixth example.

FIG. 14 illustrates another example of controlling the high voltage power supply as illustrated by FIG. 5.

The structure includes a plurality of high voltage ports 46 each for receiving the fixed output from the single unit of the high voltage power supply 43. The high voltage wirings 41 are prepared by the number corresponding to the number of capillaries. In the high voltage power supply unit 15, the high voltage application process is executed by mechanically or controllably connecting the output fixed high voltage port 46 and the high voltage wiring 41 in accordance with each step for voltage application.

In this structure, as an output of the high voltage power supply is fixed for each unit, the high voltage power supply may be developed easily and less costly.

Seventh Example

<Another Structure of Capillary Array>

Figure 15:
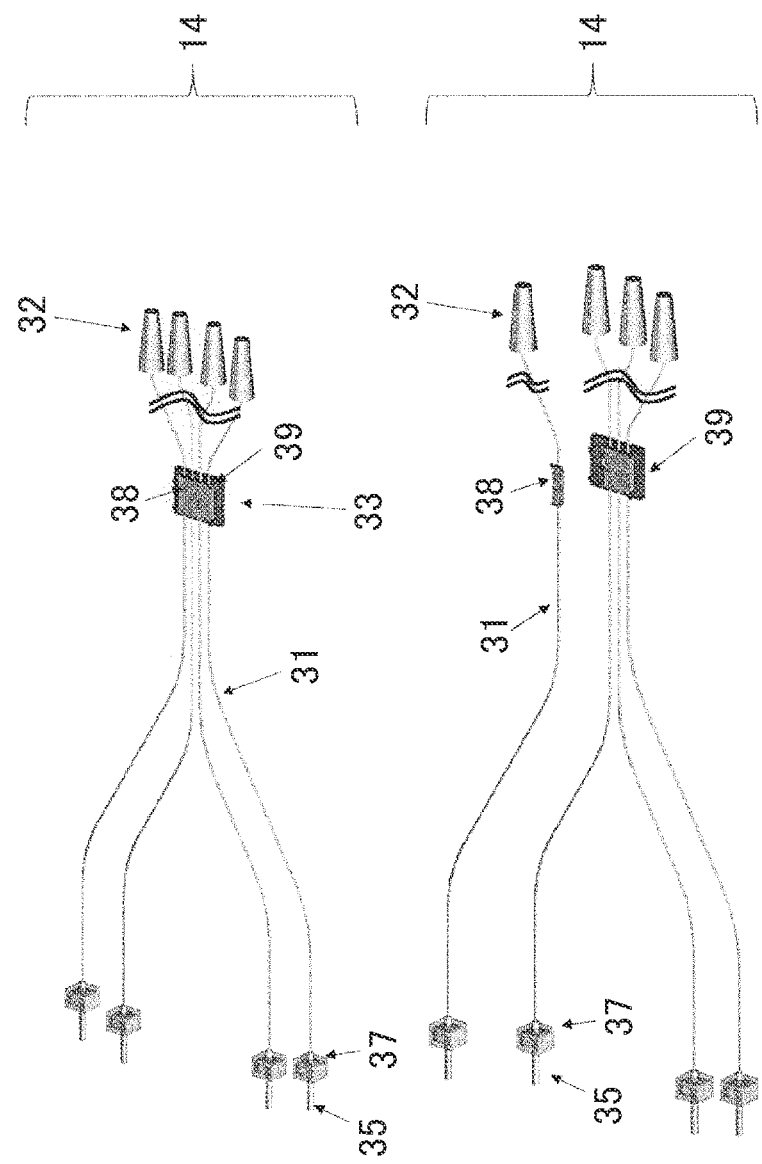
FIG. 15 illustrates a capillary array according to a seventh example.

FIG. 15 illustrates another example of the capillary array 14 as illustrated by FIG. 3A. An aligning member 38 manufactured with high accuracy is fixed to the irradiation detection region 33 of each of the capillaries 31. The aligning members 38 are aligned with one another, and fixed with an aligning member holder 39. The device has a mechanism for fixing the aligning member holder 39 with high positioning accuracy. The structure allows the irradiation unit 16 to irradiate the irradiation detection region 33 of the capillary with the irradiation light 17, and locates the position for detecting the information light.

The example is advantageous in that each of the capillaries 31 may be exchanged individually by opening the aligning member holder 39 of the capillary array 14. The capillary array 14 which allows individual execution of electrophoresis on each capillary is capable of biasing the number of operations among the multiple capillaries unless it is not limited by the software.

It is assumed that the device includes a maximum of n capillaries 31 denoted by C1, C2, Cn, and the upper limit of the number of operations of the capillary 31 is set to 500 operations of electrophoresis. In the case where various users operate the single unit of the device repeatedly, and the number of operations of the capillaries C2, Cn is around 100, there may be the case that the number of operations of the capillary C1 reaches 500 in excess of the upper limit. Under the foregoing circumstance, the device according to the first example is configured to exchange not only the capillary C1 but also the capillaries C2, Cn simultaneously. The device according to the example allows the user or the maintenance worker to exchange only the capillary C1, while allowing the continuous use of the capillaries C2 to Cn.

Direct installation of the aligning member holder 38 on the device is one of preferable structures as the aligning member holder 38 serves to align and fix the respective capillaries 31.

Eighth Example

<Another Structure of Heating/Cooling Unit>

Figure 16:
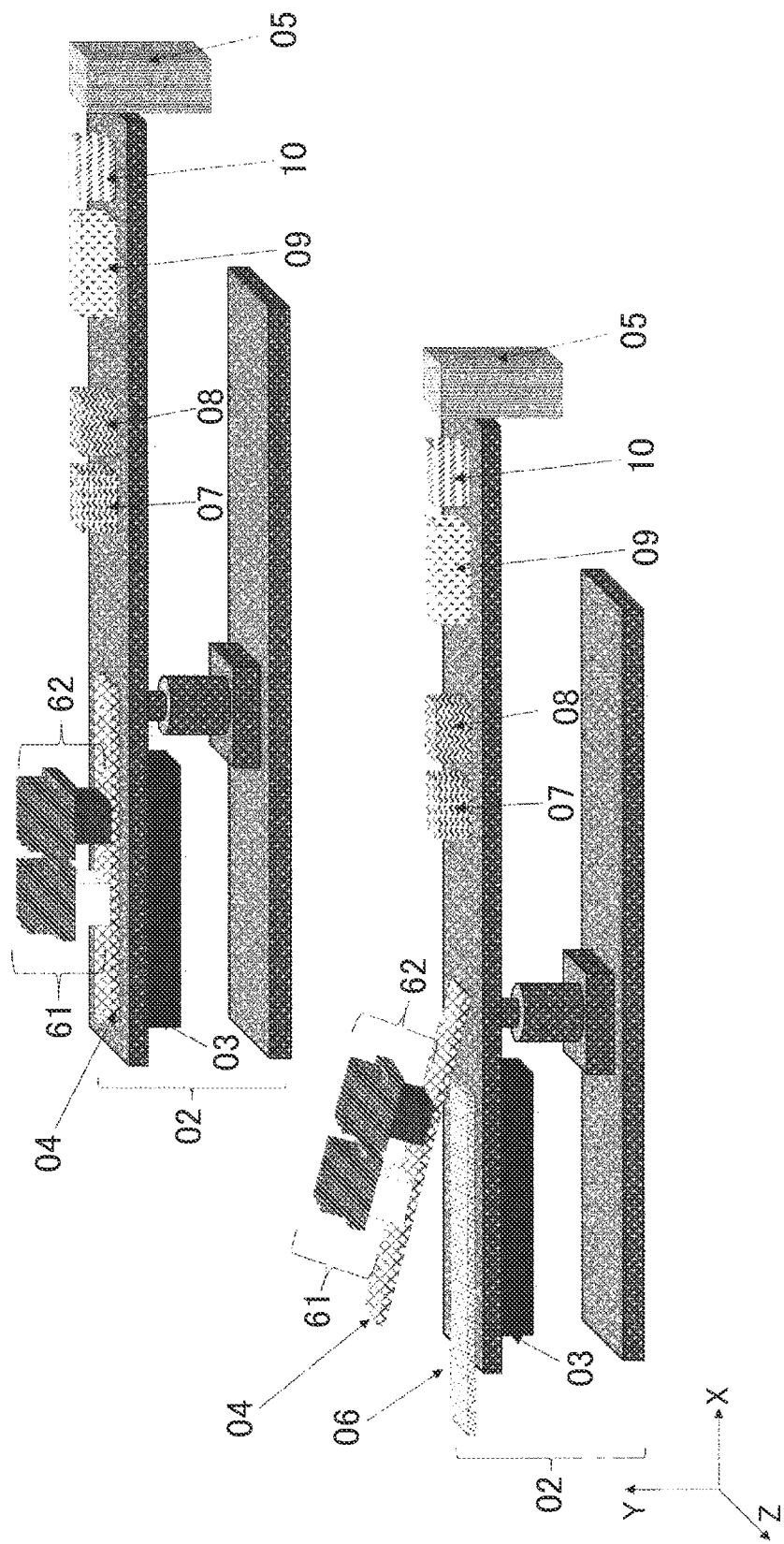
FIG. 16 illustrates a heating/cooling unit according to an eighth example.

FIG. 16 illustrates another example of the heating/cooling unit 11 as illustrated by FIGS. 1, 6 and 8. A plurality of heating/cooling units 61, 62 each with differently set temperature are prepared for the temperature cycle process as a result of movement of the liquid in the cartridge rather than the use of the single heating/cooling unit 11 which increases/decreases the temperature upon the temperature cycle process.

If three different temperatures required for the temperature cycle process in the PCR are set to 4° C., 55° C., 60° C., it is preferable to provide three heating/cooling units, each controlled to keep the set temperature constant. Because of small temperature difference between 55° C. and 60° C., it is possible to combine the heating/cooling unit 61 for keeping the temperature at 4° C. with the heating/cooling unit 62 for keeping the temperature either at 55° C. or 60° C., respectively.

Provision of the multiple heating/cooling units 61, 62 seems to be costly. Actually, however, the temperature does not have to be controlled at high speeds in accordance with the PCR. When setting the high temperature, the heater of resistance heating type is used. When setting the low temperature, the Peltier element at a slower cooling rate is used, resulting in advantageous effect of cost reduction in hardware. Further advantageous effects for the user include cost reduction in software which requires no sophisticated temperature control program, and stability.

The heating/cooling units 61, 62 are configured to be fixed to the cartridge cover 06 as illustrated by FIG. 16.

Ninth Example

<Another Structure of Heating/Cooling Unit>

Figure 17:
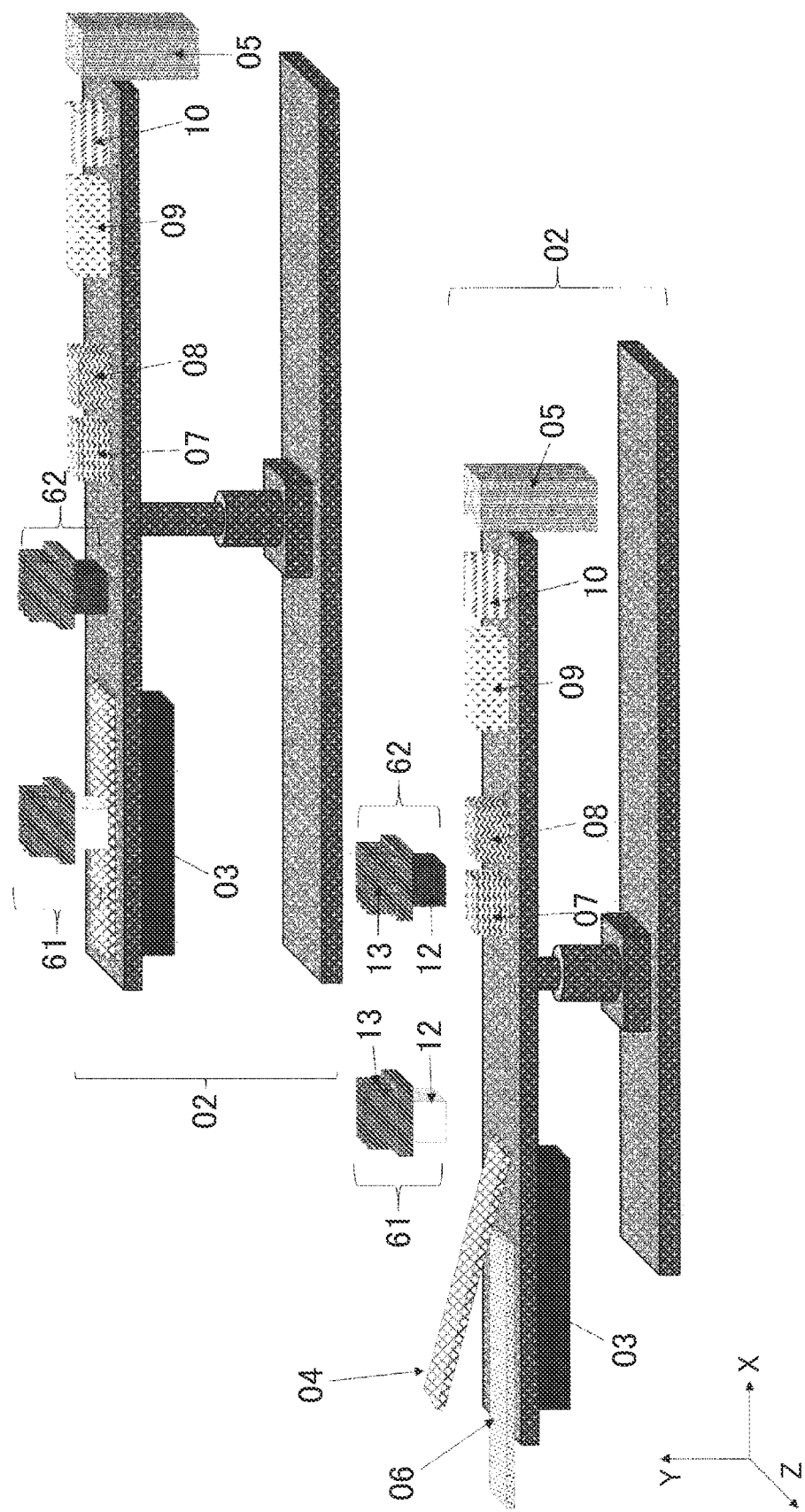
FIG. 17 illustrates a heating/cooling unit according to a ninth example.

FIG. 17 illustrates another example of the heating/cooling unit 11 as illustrated by FIGS. 1, 6 and 8.

Similarly to the structure as illustrated by FIG. 16, the multiple heating/cooling units 61, 62 each with differently set temperature are arranged along the X-axis direction. The heating/cooling units 61, 62 of the example are fixed to the device cover or the thermostat chamber unit (not shown), but not fixed to the cartridge cover 04. Upon the temperature cycle process, the structure allows the autosampler 02 for driving along the XY-axis to press the cartridge 06 against the heat conductive blocks 12 of the heating/cooling units 61, 62 without moving the liquid in the cartridge 06 as described in the eighth example. Preferably, although not illustrated, the cartridge cover 04 has a gap so as to allow the heat conductive blocks 12 of the heating/cooling units 61, 62 come in contact with the cartridge 06. The heating/cooling units 61, 62 are then fixed to the device cover, the thermostat chamber unit, or the like. Preferably, in the device, at least a part of the cartridge cover 04 is made of the material with good heat conductivity and good heat transfer coefficient so that temperature control of the cartridge 06 is executed through the cartridge cover 04.

In the structure, the heating/cooling units 61, 62 are not installed on the cartridge cover 04. The resultant advantageous effect is the weight reduction of the cartridge cover 04 as a part to be operated by the user in addition to the cost reduction and stability as described in the ninth example, resulting in improved user's workability.

Tenth Example

<Another Structure of Heating/Cooling Unit>

Figure 18:
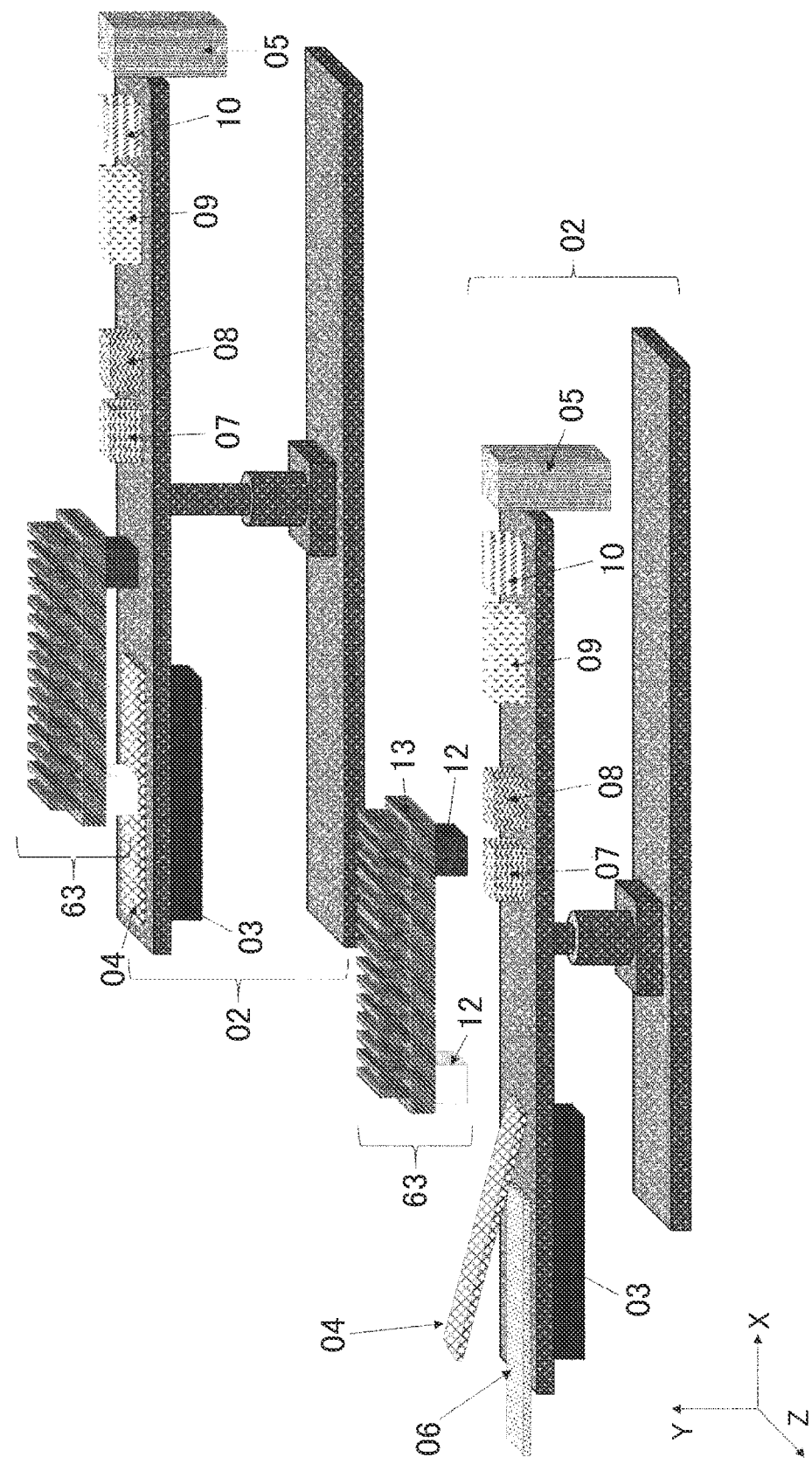
FIG. 18 illustrates a heating/cooling unit according to a tenth example.

FIG. 18 illustrates another example of the heating/cooling unit 11 as illustrated by FIGS. 1, 6 and 8.

Similarly to the structure as illustrated by FIG. 17, a heating/cooling unit 63 of the example is formed by assembling heat exchanging elements and heaters, each with differently set temperature with the heat conductive blocks 12 arranged along the X-axis direction. They are fixed to the device cover or the thermostat chamber unit, but not fixed to the cartridge cover 04. Similarly, the structure of the example is configured to allow the autosampler 02 for driving along the XY-axis to press the cartridge 06 against the heat conductive blocks 12 of the heating/cooling unit 11 upon the temperature cycle process. Unlike the structure as illustrated by FIG. 17, the heating/cooling unit 63 of the example is configured to allow the multiple heat exchanging elements and heaters, each with differently set temperature, and the multiple heat conductive blocks 12 to sharedly use the single radiator 13.

This structure provides an advantageous effect of easy adjustment of each height of the multiple heat conductive blocks 12 in addition to reduction in the number of the radiators 13. The radiator 13 generally made of metal is formed as a structure with constant rigidity. The structure is sharedly used for assembling the multiple heat conductive blocks 12 with the heat exchanging element and the heater. Easily adjustable devices with less individual difference therebetween may be provided for the user so long as the levelness is adjusted as a whole.

Eleventh Example

<Another Structure of Heating/Cooling Unit>

Figure 19:
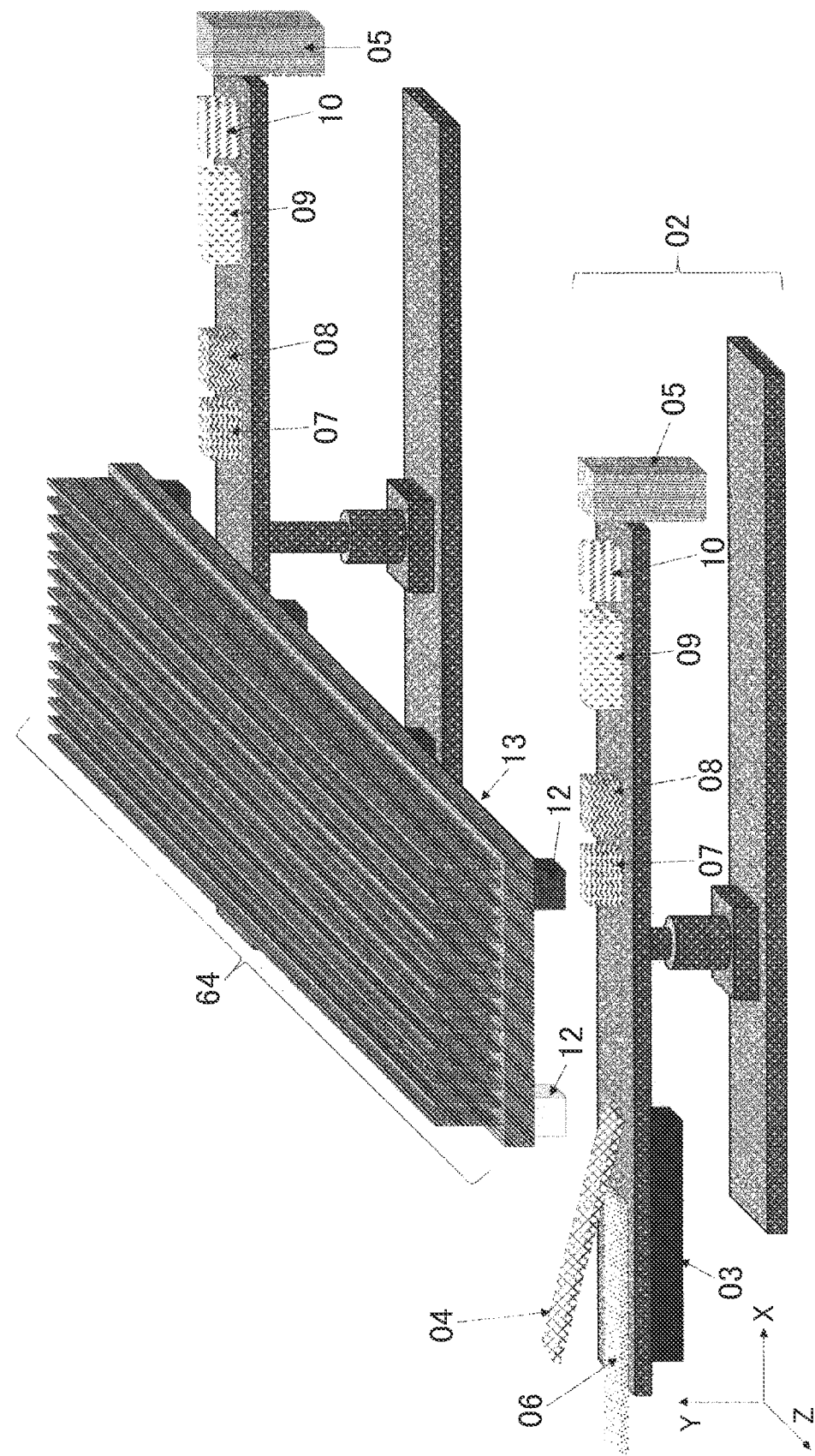
FIG. 19 illustrates a heating/cooling unit according to an eleventh example.

FIG. 19 illustrates another example of the heating/cooling unit and the radiator as illustrated by FIGS. 1, 6 and 8.

A heating/cooling unit 64 is structured to allow the multiple heat conductive blocks 12 each with differently set temperature, corresponding to the respective Lanes to share the single radiator 13. In other words, the cartridges 06 on the multiple autosamplers come in contact with the integral type heating/cooling unit 64 having the multiple heat conductive blocks 12 each with differently set temperature, and connected to the single radiator 13 so that temperature control is executed. The heating/cooling unit 64 is fixed to the device cover or the thermostat chamber unit, and is not moved by driving operations of the autosampler 02. The advantageous effect of the structure is substantially similar to that of the structure of the tenth example. The structure uses the radiator 13 larger than that of the tenth example. However, the number of the radiators 13 used for the single unit of device becomes smaller. Either one of the structures may be selected whichever such structure is more beneficial on each occasion. Referring to FIG. 19, the heat conductive blocks 12 both for heating and cooling sharedly use the single radiator 64. When prioritizing stability, and the high temperature raising rate taken for making the stabilized state, it is preferable to divide the radiator 64 in accordance with the temperature.

Twelfth Example

<Electrophoresis Device Capable of Individually Executing Electrophoresis>

Figure 20:
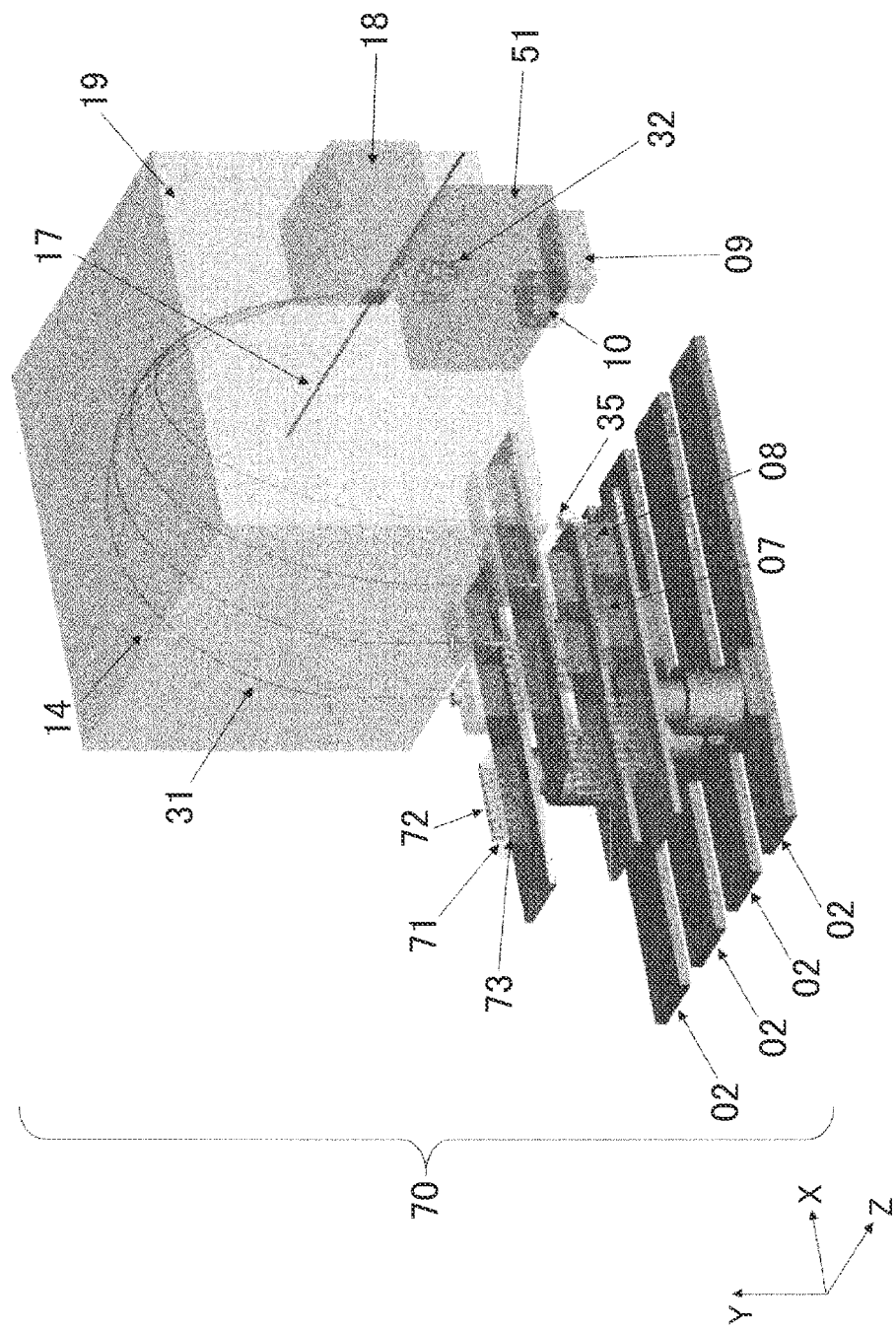
FIG. 20 illustrates an electrophoresis device according to a twelfth example.

Referring to FIG. 20 illustrating the structure of the electrophoresis device, an explanation will be made with respect to another example for implementing the present invention, which is different from the first example.

The first and the second examples have been described with respect to an example of the structure of the pretreatment-integrated electrophoresis device 01. The present invention is applicable to the electrophoresis device as the general-purpose machine for executing electrophoresis of the pretreated analysis sample.

FIG. 20 illustrates an example of a structure of an electrophoresis device 70 for general use. The user determines the type and quantity of the analysis sample to be measured, and injects the analysis sample into a sample tube 71 having eight wells. The sample tube 71 is fitted with a sample septum 72 by the user. the sample tube 71 is held with a sample holder 73 together with the sample septum 72. The sample septum 72 is an inner lid having a hole or a slit formed in an elastomer material designed to be fitted with the sample tube 71 so that the conductive pipe 35 passes through the hole or the slit. This member prevents evaporation of the sample as lapse of time from placement of the sample tube 71 in the device, and reduces carry-over caused by adhesion of droplets onto the side surface of the conductive pipe 35 of the capillary.

The sample holder 73 is a stocker for storing the sample tube 71 with high positioning accuracy while being kept upright, and provided with a lid to prevent falling of the sample tube 71 and the sample septum 72 during analysis. The lid has the hole or the slit, through which the capillary 31 accesses the sample tube 71. The sample holder 73 is disposed on the autosampler with high positioning accuracy, and is easily attached/detached by the user.

Other structures as illustrated by FIG. 20 are similar to those described in the second example. That is, the waste liquid container 08 and the cathode-side buffer solution container 07 are disposed above the autosampler 02. The device includes the capillary array 14, the thermostat chamber unit 19, the detector 18, the pump unit 51, the anode-side buffer solution container 09, and the polymer container 10. Although not illustrated, the high voltage power supply, the high voltage wiring, and the irradiation unit including the light source for emitting the irradiation light are provided as well as the main board as the electric substrate and the control computer.

FIG. 20 illustrates the sample tube 72 as the sample container in the device. Alternatively, a 96-well type well plate may be used as well. When using the 96-well type well plate as the sample container, the autosampler stage is configured to be triaxially operated in the XYZ-axis direction rather than biaxially operated in the XY-axis direction.

In the example, the pump unit 51 similar to that of the second example is employed as descried above. It is preferable to use the polymer delivery unit 05 to constitute the device similarly to the first example.

The foregoing structures allow the device for executing individual electrophoresis to be provided for users not only as the machine dedicated to the single application such as the STR analysis through application of the present invention but also as the general-purpose machine formed as the base sequence analysis device.

LIST OF REFERENCE SIGNS

01: pretreatment-integrated electrophoresis device, 02: autosampler, 03: pretreatment unit, 04: cartridge cover, 05: polymer delivery unit, 06: cartridge, 07: cathode-side buffer solution container, 08: waste liquid container, 09: anode-side buffer solution container, 10: polymer container, 11: heating/cooling unit, 12: heat conductive block, 13: radiator, 14: capillary array, 15: high voltage power supply unit, 16: irradiation unit, 17: irradiation light, 18: detector, 19: thermostat chamber unit, 21: cylinder, 22: sealing member, 23: connector, 24: plunger, 25: pouch, 26: connector, 31: capillary, 32: capillary head, 33: irradiation detection region, 34: detection holder, 35: conductive pipe, 36: metal plate, 37: load header, 38: aligning member, 39: aligning member holder, 41: high voltage wiring, 42: high voltage power supply, 43: high voltage power supply, 44: output high voltage port, 45: fixed high voltage power supply, 46: high voltage power supply, 51: pump unit, 52: polymer flow path block, 53: flow path, 54: anode electrode, 55: anode-side valve, 56: liquid feeder, 57: liquid feeder-side valve, 58: check valve, 59: holder, 61,62,63,64: heating/cooling unit, 70: electrophoresis device, 71: sample tube, 72: sample septum, 73: sample holder

The invention claimed is:

1. An electrophoresis device, comprising:
    a plurality of capillaries each filled with a separation medium;
    a thermostat chamber for holding the capillaries at a predetermined temperature;
    an irradiation detector which executes light irradiation and detection in an electrophoresis process using the capillaries;
    a high voltage power supply unit for voltage application to the capillaries;
    a liquid feeding mechanism for feeding the separation medium to the capillaries; and
    an autosampler for conveying containers each holding a reagent or a sample to the capillary, wherein the voltage application to the capillaries by the high voltage power supply unit is controlled for each of the capillaries,
    wherein the container for holding the sample is a cartridge in which a pretreatment of the sample is executed.

2. The electrophoresis device according to claim 1, wherein the high voltage power supply unit includes high voltage power supplies by the number equal to the number of the capillaries.

3. The electrophoresis device according to claim 1, wherein the high voltage power supply unit includes one high voltage power supply, and a plurality of high voltage ports.

4. The electrophoresis device according to claim 3, wherein:
    an output from each of the high voltage ports is fixed; and
    each connection between the capillaries and the high voltage ports is switchable.

5. The electrophoresis device according to claim 1, wherein:
    the high voltage power supply unit includes a plurality of high voltage power supplies each generating a fixed output; and
    each connection between the capillaries and the high voltage power supplies is switchable.

6. The electrophoresis device according to claim 1, further comprising a plurality of units of the autosamplers.

7. The electrophoresis device according to claim 6, wherein:
    the number of the autosamplers is equal to the number of the capillaries; and
    each of the autosamplers is driven biaxially.

8. The electrophoresis device according to claim 7, wherein:
the containers include a cartridge or a sample container for holding the sample, a separation medium container for holding the separation medium, a cathode-side buffer solution container and an anode-side buffer solution container, each holding buffer solution for the voltage application to both ends of each of the capillaries, and a waste liquid container; and
each of distances between a connection port of the waste liquid container and a connection port of the separation medium container, between a connection port of the cathode-side buffer solution container and a first connection port of the anode-side buffer solution container, and between a connection port of the cartridge or the sample container and a second connection port of the anode-side buffer solution container is equal in length.

9. The electrophoresis device according to claim 6, wherein:
the autosamplers are provided with a plurality of containers which contain reagents or samples;
each of the containers has a connection port to be connected to each of the capillaries; and
the connection ports of the containers are arranged in a single row on each of the autosamplers.

10. The electrophoresis device according to claim 1, wherein:
the liquid feeding mechanism is connected to a separation medium container which holds the separation medium and a buffer solution container which holds buffer solution for voltage application to the capillaries;
the liquid feeding mechanism includes connection ports for connection to the capillaries, and flow paths for connecting the capillaries to the separation medium container and the buffer solution container; and
the flow path is provided for each of the connection ports.

11. The electrophoresis device according to claim 10, wherein the number of the connection ports is equal to the number of the capillaries.

12. The electrophoresis device according to claim 10, wherein the flow path is provided with a valve.

13. The electrophoresis device according to claim 1, further comprising a heating/cooling unit for executing temperature control of the cartridge, wherein the heating/cooling unit includes a heat exchanging element for heating or cooling the cartridge, a radiator for improving cooling efficiency, and a heat conductive block for transferring heat to the cartridge.

14. The electrophoresis device according to claim 13, further comprising a plurality of heating/cooling units each with differently set temperature.

15. The electrophoresis device according to claim 13, wherein the heating/cooling unit is disposed for each of the cartridges to be installed.

16. The electrophoresis device according to claim 13, wherein the heating/cooling unit includes a plurality of units of the heat conductive blocks for a single unit of the radiator.

17. The electrophoresis device according to claim 16, wherein:
each of the heat conductive blocks of the heating/cooling unit is provided for each of the cartridges to be installed; and
the radiator is used by the plurality of cartridges to be installed.

18. The electrophoresis device according to claim 1, further comprising a heating/cooling unit for executing temperature control of the cartridge, wherein the heating/cooling unit includes a heater for heating the cartridge, and a heat conductive block for transferring heat to the cartridge.

19. The electrophoresis device according to claim 1, wherein:
the autosampler includes a cartridge cover for fixing the cartridge to the autosampler; and
the cartridge cover is provided with a heating/cooling unit for executing temperature control of the cartridge.

20. The electrophoresis device according to claim 1, further comprising a holder for aligning the capillaries, wherein:
the holder collectively fixes detection regions of the capillaries, which are irradiated with light from the irradiation detector; and
both ends of each of the capillaries are individually separated.

21. The electrophoresis device according to claim 20, wherein each of the capillaries is detachable from the holder.

22. An electrophoresis device, comprising:
a plurality of capillaries each filled with a separation medium;
a thermostat chamber for holding the capillaries at a predetermined temperature;
an irradiation detector which executes light irradiation and detection in an electrophoresis process using the capillaries;
a high voltage power supply unit for voltage application to the capillaries;
a liquid feeding mechanism for feeding the separation medium to the capillaries; and
an autosampler for conveying containers each holding a reagent or a sample to the capillary, wherein the voltage application to the capillaries by the high voltage power supply unit is controlled for each of the capillaries,
wherein:
the high voltage power supply unit includes one high voltage power supply, and a plurality of high voltage ports;
an output from each of the high voltage ports is variable; and
the number of the high voltage ports is equal to the number of the capillaries.

23. An electrophoresis device, comprising:
a plurality of capillaries each filled with a separation medium;
a thermostat chamber for holding the capillaries at a predetermined temperature;
an irradiation detector which executes light irradiation and detection in an electrophoresis process using the capillaries;
a high voltage power supply unit for voltage application to the capillaries;
a liquid feeding mechanism for feeding the separation medium to the capillaries; and
an autosampler for conveying containers each holding a reagent or a sample to the capillary, wherein the voltage application to the capillaries by the high voltage power supply unit is controlled for each of the capillaries,
wherein the liquid feeding mechanism for feeding the separation medium to the capillary is installed on each of the autosamplers.

* * * * *